(12) United States Patent
Kuramochi et al.

(10) Patent No.: US 8,771,902 B2
(45) Date of Patent: Jul. 8, 2014

(54) MANUFACTURE OF FUEL CELL

(75) Inventors: Takeharu Kuramochi, Yokohama (JP); Masanori Iwamoto, Yokohama (JP); Masahiko Katsu, Ayase (JP); Kaoru Eguchi, Tokyo (JP); Masahiro Omata, Yokohama (JP); Hideto Kanafusa, Yokohama (JP); Yoshiki Muto, Zama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 13/116,503

(22) Filed: May 26, 2011

(65) Prior Publication Data

US 2011/0229802 A1 Sep. 22, 2011

Related U.S. Application Data

(63) Continuation of application No. 10/581,350, filed as application No. PCT/JP2004/016614 on Nov. 2, 2004.

(30) Foreign Application Priority Data

Dec. 2, 2003 (JP) .................................. 2003-402491
Dec. 19, 2003 (JP) .................................. 2003-422613

(51) Int. Cl.
*H01M 8/00* (2006.01)
*H01M 8/02* (2006.01)
*H01M 8/10* (2006.01)
*H01M 2/00* (2006.01)

(52) U.S. Cl.
USPC ............................ 429/535; 429/479; 429/507

(58) Field of Classification Search
CPC ............... H01M 8/10; H01M 8/1004; H01M 2008/1293; H01M 8/1213; H01M 2008/1095; H01M 8/2475

USPC .......................................... 429/535, 479, 507
See application file for complete search history.

(56) References Cited

U.S. PATENT DOCUMENTS 5,761,793 A 6/1998 Bevers et al.
6,197,147 B1 3/2001 Bonsel et al.
(Continued)

FOREIGN PATENT DOCUMENTS

DE       28 02 466         7/1979
DE       195 09 749 C2    10/1996
(Continued)

OTHER PUBLICATIONS

Final Office Action U.S. Appl. No. 13/116,489 dated Nov. 25, 2011.

(Continued)

*Primary Examiner* — Barbara Gilliam
*Assistant Examiner* — Angela Martin
(74) *Attorney, Agent, or Firm* — Foley & Lardner LLP

(57) ABSTRACT

A fuel cell is manufactured using a polymer electrolyte membrane (1). A catalyst layer (12) is formed at fixed intervals on the surface of the strip-form polymer electrolyte membrane (1) in the lengthwise direction thereof, and conveyance holes (10) are formed in series at fixed intervals on the two side portions thereof. By rotating a conveyance roller (32) comprising on its outer periphery projections which engage with the holes (10), the polymer electrolyte membrane (1) is fed from a reel (9). A GDL (6) and a separator (7) are adhered to the fed polymer electrolyte membrane (1) at a predetermined processing timing based on the rotation speed of the conveyance roller (32), and thus the fuel cell is manufactured efficiently while the GDL (6) and separator (7) are laminated onto the catalyst layer (12) accurately.

14 Claims, 22 Drawing Sheets

(56) References Cited

U.S. PATENT DOCUMENTS

| | | |
|---|---|---|
| 6,500,217 B1 | 12/2002 | Starz et al. |
| 6,686,085 B1 | 2/2004 | Fujii et al. |
| 2001/0028974 A1* | 10/2001 | Nakata et al. .................. 429/34 |
| 2003/0022046 A1 | 1/2003 | Hayashi et al. |
| 2005/0238800 A1 | 10/2005 | Shinn et al. |
| 2008/0311403 A1* | 12/2008 | Ripley et al. ................. 428/411.1 |

FOREIGN PATENT DOCUMENTS

| | | | |
|---|---|---|---|
| DE | 195 48 421 A1 | 9/1997 | |
| DE | 195 48 422 A1 | 9/1997 | |
| DE | 199 10 773 A1 | 9/2000 | |
| DE | 101 24 272 A1 | 11/2002 | |
| EP | 0 672 529 B1 | 9/1995 | |
| EP | 1 246 281 | 10/2002 | |
| EP | 1 406 328 | 4/2004 | |
| JP | 09-007627 A | 1/1997 | |
| JP | 2001-057226 | 2/2001 | |
| JP | 2001-118592 | 4/2001 | |
| JP | 2001-148252 | 5/2001 | |
| JP | 2001-236971 * | 8/2001 | ............ H01M 8/02 |
| JP | 2002-216834 | 8/2002 | |
| JP | 2002-313354 * | 10/2002 | ............ H01M 8/02 |
| JP | 2003-022810 | 1/2003 | |
| JP | 2003-045462 | 2/2003 | |
| JP | 2003-151611 | 5/2003 | |
| WO | WO 03/073540 A2 | 9/2003 | |

OTHER PUBLICATIONS

Non-Final Office Action U.S. Appl. No. 13/116,489 dated Jun. 23, 2011.
Non-Final Office Action U.S. Appl. No. 13/116,489 dated Oct. 5, 2012.
Notice of Allowance U.S. Appl. No. 13/116,489 dated Apr. 25, 2013.

* cited by examiner

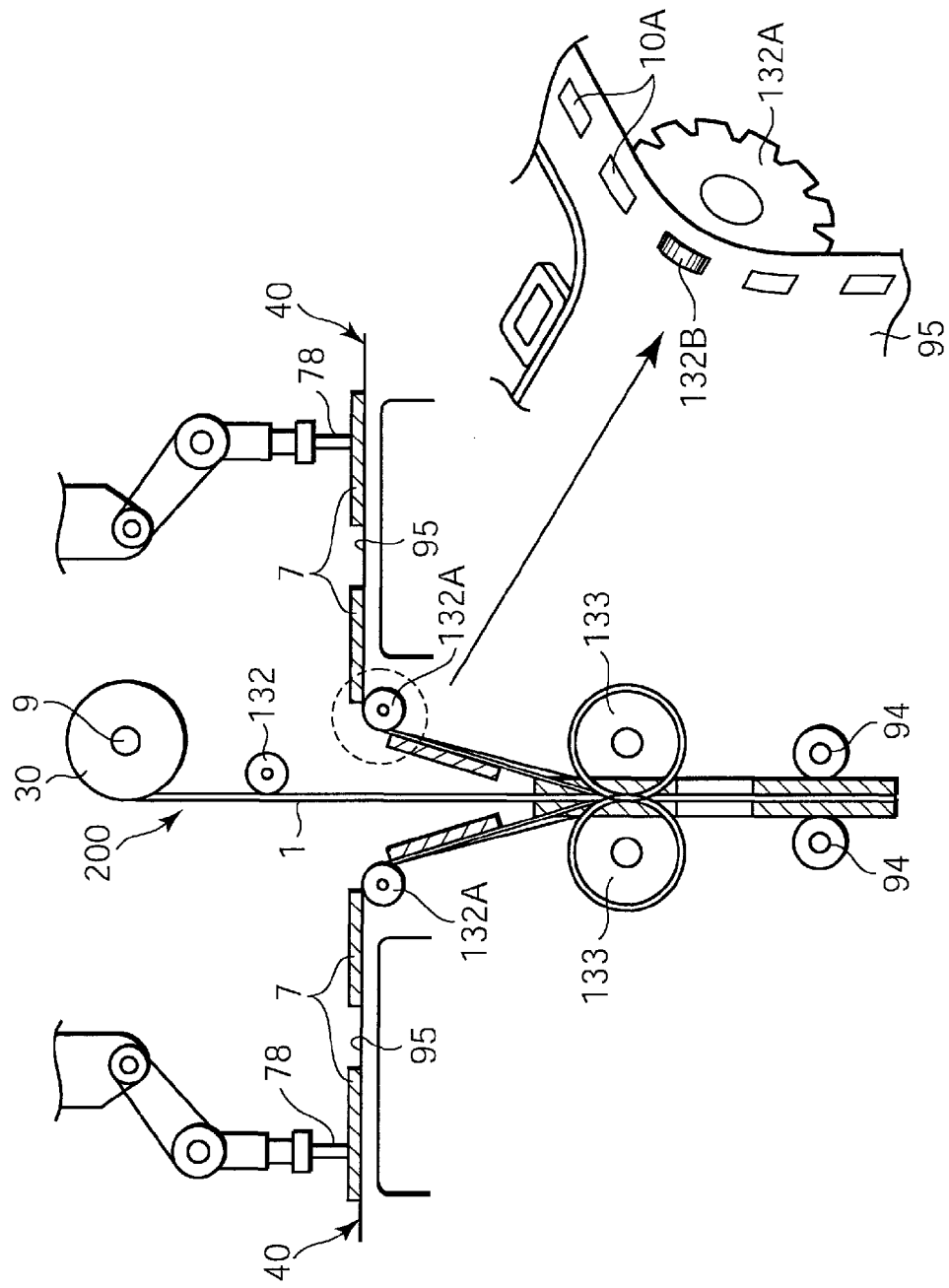

MANUFACTURE OF FUEL CELL

CROSS-REFERENCE TO RELATED APPLICATIONS

This application is a continuation of U.S. patent application Ser. No. 10/581,350, filed Jun. 2, 2006, which is the National Phase of International Patent Application No. PCT/JP2004/016614, filed Nov. 2, 2004, and published as WO2005/055349, which claims priority of Japanese Patent Application Nos. 2003-402491, filed Dec. 2, 2003, and 2003-422613, filed Dec. 19, 2003. The contents of these applications are incorporated herein by reference in their entirety.

FIELD OF THE INVENTION

This invention relates to the manufacture of a fuel cell.

BACKGROUND OF THE INVENTION

JP2001-236971A, published by the Japan Patent Office in 2001, discloses a method of obtaining a plurality of fuel cells in a continuous strip form by feeding one end of a polymer electrolyte membrane from a roll of polymer electrolyte membrane using a roller, and then performing catalyst layer formation, gas diffusion layer formation, and separator joining processes on the moving polymer electrolyte membrane in sequence.

SUMMARY OF THE INVENTION

When this manufacturing method is applied, the polymer electrolyte membrane must be fed in fixed lengths and stopped precisely in the locations at which each process is performed. However, taking roller slippage into consideration, such positioning is not easy.

It is therefore an object of this invention to increase the feeding precision with which a polymer electrolyte membrane is fed from a roll so that the polymer electrolyte membrane is positioned accurately in a predetermined position.

Another object of this invention is to manufacture a fuel cell stack efficiently using a roll of polymer electrolyte membrane.

To achieve these objects, this invention provides a fuel cell manufacturing method for manufacturing a fuel cell by implementing predetermined processing on a polymer electrolyte membrane. The manufacturing method comprises a process of feeding the polymer electrolyte membrane, which is wound around a reel, formed in strip form, and has conveyance holes formed in series at fixed intervals on both side portions thereof in a lengthwise direction, by rotating a conveyance roller comprising on an outer periphery thereof projections which engage with the conveyance holes, and a process of performing predetermined processing at a predetermined processing timing which is set on the basis of a rotation speed of the conveyance roller.

This invention also provides a fuel cell manufacturing device for manufacturing a fuel cell by implementing predetermined processing on a polymer electrolyte membrane. The manufacturing device comprises a polymer electrolyte membrane which is wound around a reel, formed in strip form, and has a conveyance hole formed in series at fixed intervals on both side portions thereof in a lengthwise direction, a conveyance roller comprising on an outer periphery thereof projections which engage with the conveyance holes, and a processing unit which performs predetermined processing on the polymer electrolyte membrane, which is fed from the reel by rotating the conveyance roller, at a predetermined processing timing set on the basis of a rotation speed of the conveyance roller.

This invention also provides a polymer electrolyte membrane which is wound around a reel and subjected to predetermined processing to manufacture a fuel cell. The polymer electrolyte membrane comprises a conveyance hole formed in series at fixed intervals on both side portions thereof in a lengthwise direction. The conveyance holes are constituted to engage with projections formed on a conveyance roller, whereby the polymer electrolyte membrane is fed from the reel as the conveyance roller rotates.

This invention also provides a manufacturing method for a fuel cell formed by laminating a polymer electrolyte membrane and a separator alternately. The manufacturing method comprises a first process of supplying the film-form polymer electrolyte membrane in parallel from a side of a first separator, which is held in a predetermined position, to a position facing the first separator, a second process of supplying a second separator to an opposite side of the polymer electrolyte membrane which faces the first separator, to the first separator, and a third process of displacing the second separator toward the first separator such that the polymer electrolyte membrane is sandwiched between the first separator and the second separator while being cut into a predetermined shape and dimension.

This invention also provides a manufacturing device for a fuel cell formed by laminating a polymer electrolyte membrane and a separator alternately. The manufacturing device comprises a polymer electrolyte membrane conveyance unit which supplies the film-form polymer electrolyte membrane in parallel from a side of a first separator, which is held in a predetermined position, to a predetermined position facing the first separator, a separator supply unit which supplies a second separator to an opposite side of the polymer electrolyte membrane, which faces the first separator, to the first separator, and a lamination unit which displaces the second separator toward the first separator such that the polymer electrolyte membrane is sandwiched between the first separator and the second separator while being cut into a predetermined shape and dimension.

The details of this invention, as well as other features and advantages thereof, are described in the following description of the specification and illustrated in the attached drawings.

BRIEF DESCRIPTION OF THE DRAWINGS

FIGS. 16A-16C are side views and perspective views showing the main parts of a fuel cell manufacturing device according to a second embodiment of this invention.

DESCRIPTION OF THE PREFERRED EMBODIMENTS

Figure 1:
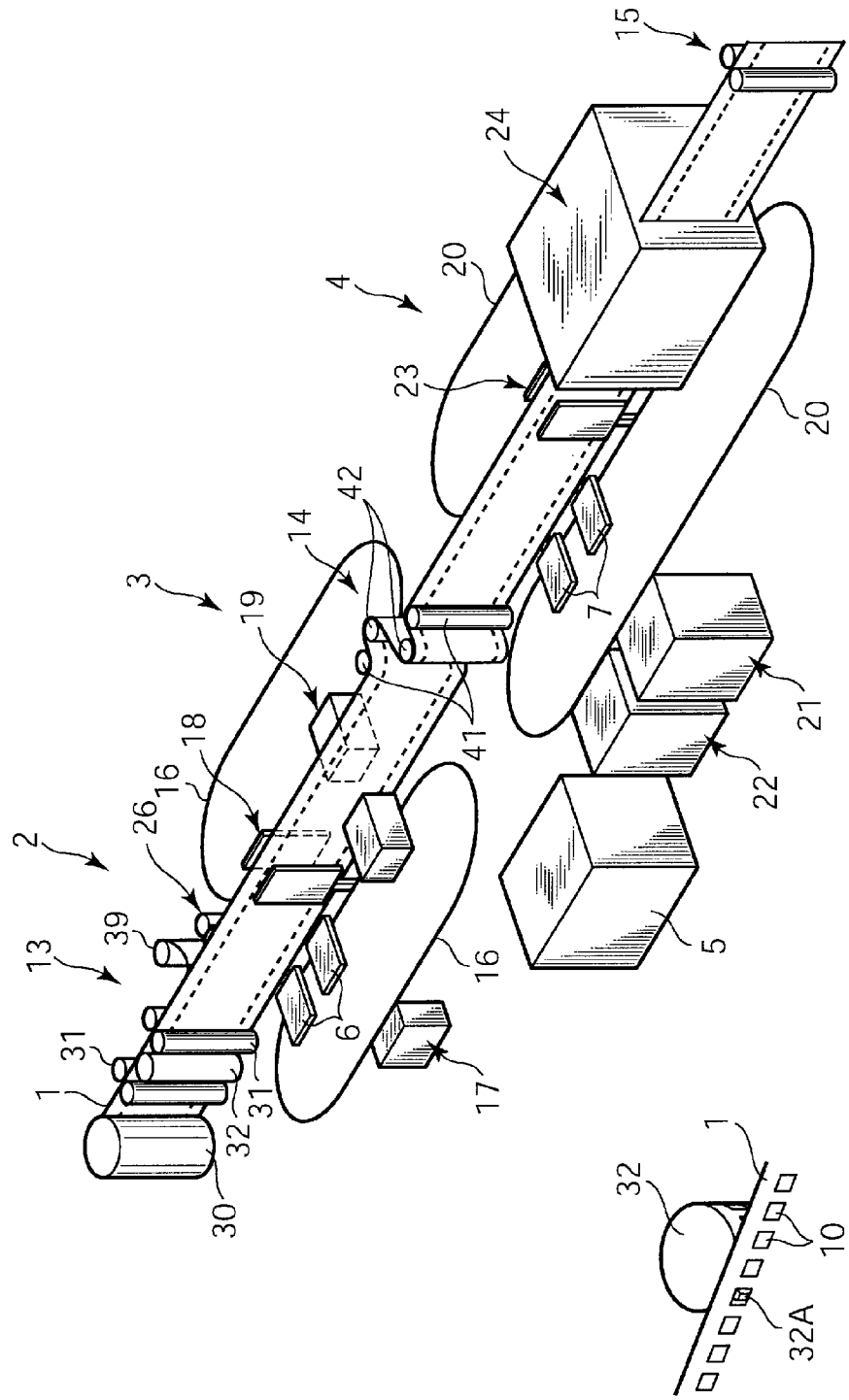
FIGS. 1A and 1B are a schematic perspective view and a principal enlarged view of a fuel cell manufacturing device according to this invention.

Referring to FIG. 1A of the drawings, a fuel cell manufacturing device comprises an MEA conveyance unit 2 which draws a membrane electrode assembly (MEA) 1 from an MEA roll 30 and conveys the MEA 1, a GDL attachment unit 3 which adheres a gas diffusion layer (GDL) 6 to both surfaces of the MEA 1, and a separator attachment unit 4 which fixes a separator 7 to the outside of the GDL 6. The fuel cell manufacturing device further comprises a controller 5 which controls the MEA conveyance unit 2, GDL attachment unit 3, and separator attachment unit 4 synchronously.

Figure 3:
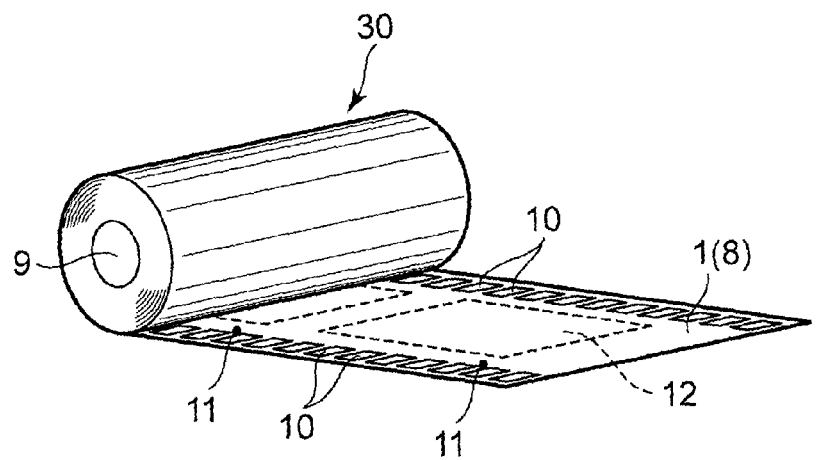
FIG. 3 is a perspective view of a membrane electrode assembly (MEA) roll according to this invention.

Referring to FIG. 3, the MEA 1 is constituted by a polymer electrolyte membrane and catalyst layers 12 made from platinum or the like and provided on both surfaces of the polymer electrolyte membrane at a predetermined pitch, as shown by the broken lines. The catalyst layers 12 constitute the electrodes of the fuel cell. The surface of the MEA 1, including the catalyst layer 12, is covered by a protective sheet 8.

The MEA 1 and protective sheet 8 are wound integrally onto a reel 9 to form a roll 30. Conveyance holes 10 are formed on the two side portions of the MEA 1 and protective sheet 8 at equal intervals in the lengthwise direction. Optical marks 11 are printed on one surface of the MEA 1 in advance at equal intervals to the formation interval of the catalyst layer 12. To detect the optical mark 11, the MEA conveyance unit 2 comprises an optical sensor 26 shown in FIG. 5A. The optical sensor 26 outputs a unique signal to the controller 5 every time the optical mark 11 and the hole 10 are detected thereby. The controller 5 learns the formation positions of the catalyst layers 12 on the basis of these signals, and controls the MEA conveyance unit 2, GDL attachment unit 3, and separator attachment unit 4 such that the lamination positions of the catalyst layer 12, GDL 6, and separator 7 are matched with a high degree of precision.

In this embodiment, the roll 30 of the MEA 1, on which the catalyst layer 12 is integrated with the polymer electrolyte membrane in advance, is used. However, a roll of a polymer electrolyte membrane alone may be used, and a catalyst layer formation unit for forming the catalyst layer on the surface of the polymer electrolyte membrane fed from the roll may be disposed between the roll and the GDL attachment unit 3. Alternatively, the catalyst layer 12 may be formed integrally with the polymer electrolyte membrane contact surface of the GDL 6 in advance such that the GDL attachment unit 3 fixes the integral GDL 6 and catalyst layer 12 to the polymer electrolyte membrane In these cases also, the lamination positions of the catalyst layer 12, GDL 6, and separator 7 on the polymer electrolyte membrane can be fixed with a high degree of precision by the output signals from the optical sensor 26.

Figure 4:
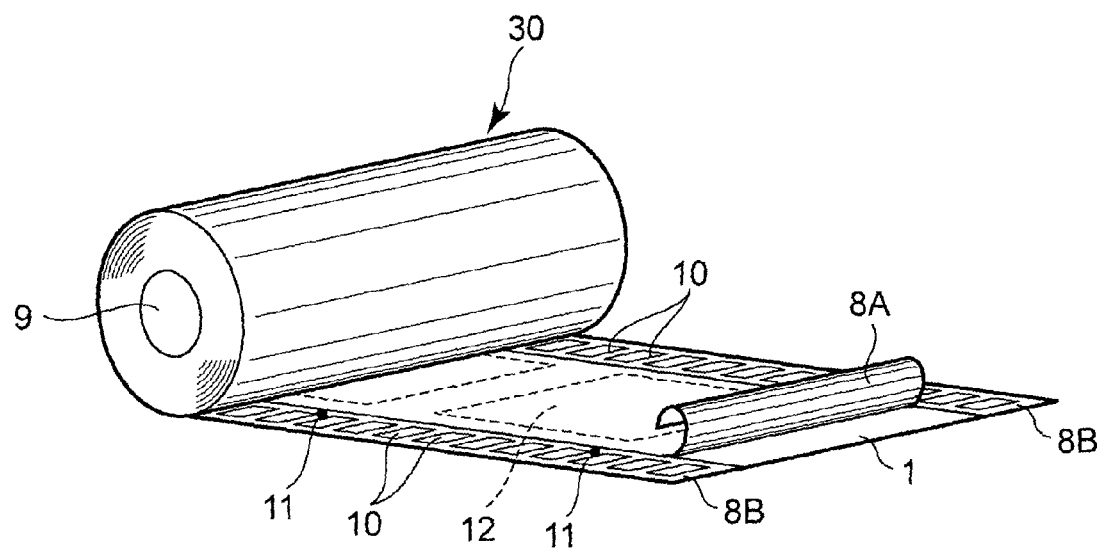
FIG. 4 is similar to FIG. 3, but shows a different constitution relating to a protective sheet.

The MEA 1 is covered entirely by the protective sheet 8. As shown in FIG. 4, the protective sheet 8 may be divided into a first sheet 8B covering the two side portions of the MEA 1, excluding the conveyance holes 10, and a second sheet 8A covering the central portion on the inside of the first sheet 8B.

The protective sheet 8 protects the polymer electrolyte membrane and the catalyst layer 12 thereabove, and is removed from the MEA 1 before the GDL 6 is fixed onto the surface of the MEA 1 during the fuel cell manufacturing process. At this time, the second sheet 8A alone may be removed, leaving the first sheet 8B intact. In so doing, the conveyance holes 10 can be protected throughout the entire fuel cell manufacturing process.

Returning to FIG. 1A, the MEA conveyance unit 2 comprises an MEA supply portion 13, an MEA tensioner 14, and a pair of MEA traction rollers 15.

The GDL attachment unit 3 is disposed between the MEA supply portion 13 and the MEA tensioner 14, while the separator attachment unit 4 is disposed between the MEA tensioner 14 and the pair of MEA traction rollers 15. The pair of MEA traction rollers 15 sandwich the MEA 1 and pull the MEA 1 by means of frictional force. The MEA tensioner 14 eliminates slackness from the MEA 1 between the GDL attachment unit 3 and separator attachment unit 4, and maintains the tension of the MEA 1 at a constant level. The MEA tensioner 14 is constituted by a set of mobile rollers 42 urged in a direction away from each other by a spring, and a pair of fixed rollers 41 disposed upstream and downstream of the mobile rollers 42, respectively, in the movement direction of the MEA 1.

Figure 5:
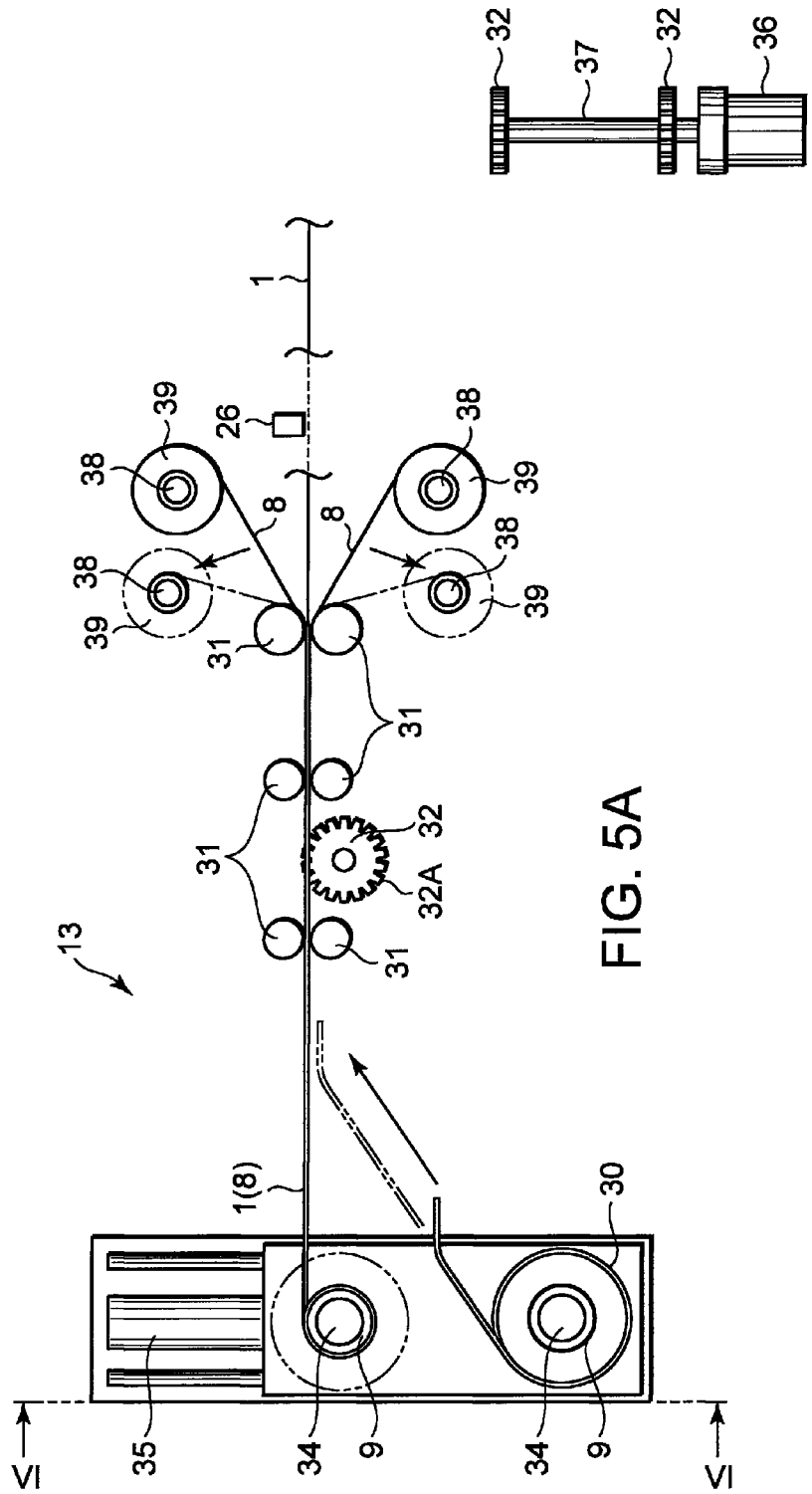
FIGS. 5A and 5B are a plan view of an MEA supply unit and a side view of a conveyance roller, provided in the fuel cell manufacturing device.

Referring to FIGS. 5A and 5B, the MEA supply unit 13 comprises a reel holding portion 33 housing the roll 30 of the MEA 1.

Figure 6:
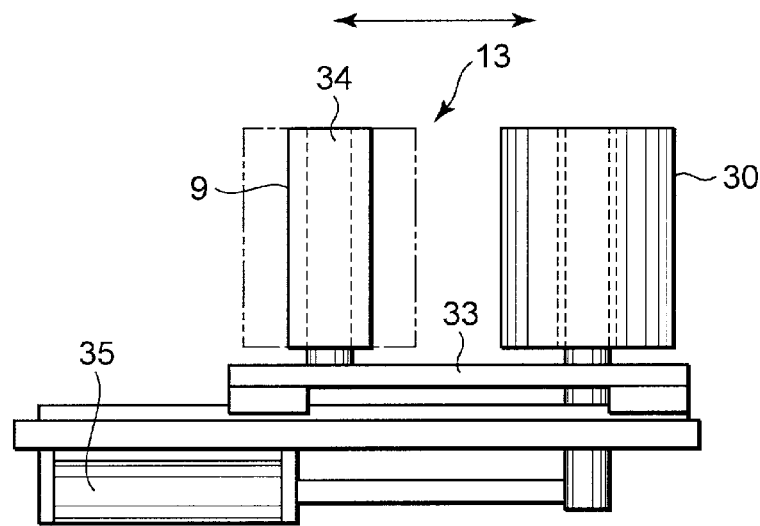
FIG. 6 is a side view of a reel holding portion seen from the direction of VI-VI in FIG. 5A.

The reel holding portion 33 comprises two rotary shafts 34, and the reel 9 for winding the MEA 1 is mounted on each rotary shaft 34. The reel holding portion 33 displaces in a direction indicated by the arrow in FIG. 6 as a hydraulic cylinder 35 expands and contracts.

As shown in FIG. 5A, when the roll 30 on the upper side of the figure runs low, a tip end of the MEA 1 is drawn from the roll 30 on the lower side of the figure and fixed to the MEA 1 that is currently being supplied by a clip or thermal adhesion. The MEA 1 fed from the roll 30 on the upper side of the figure is then severed. Further, the hydraulic cylinder 35 contracts such that the reel holding portion 33 moves upward in the figure. Thereafter, the MEA 1 is fed from the roll 30 on the lower side of the figure. While the lower side roll 30 is fed, the upper side roll 30 is removed together with the reel 9 and exchanged for a new roll 30. By means of this constitution, the reel holding portion 33 is capable of feeding the MEA 1 uninterruptedly.

As shown in FIG. 1B, the MEA supply portion 13 comprises a conveyance roller 32 having projections 32A which engage with the conveyance holes 10 in the MEA 1 in order to draw the MEA 1 from the reel holding portion 33. As shown in FIG. 5B, the conveyance roller 32 is fixed to a drive shaft 37 which is driven by a servo motor 36.

A support roller pair 31 is provided both directly before and directly after the conveyance roller 32 in the feeding direction of the MEA 1. The pairs of support rollers 31 sandwich the MEA 1 drawn from the reel holding portion 33 by the conveyance roller 32 from either side, thereby preventing the MEA 1 from twisting or wagging.

The MEA support portion 13 comprises two pairs of protective sheet recovery reels 39 in symmetrical positions on either side of the MEA 1 for winding up the protective sheet 8 on one surface of the MEA 1 and the protective sheet 8 on the other surface of the MEA 1. The protective sheet recovery reels 39 are driven to rotate by a shaft 38. The two protective sheet recovery reels 39 positioned above the MEA 1 in FIG. 5A are applied selectively to recovery of the protective sheet 8 by means of a similar structure to that of the reel holding portion 33 described above. More specifically, when one of the protective sheet recovery reels 39 is full, the other protective sheet recovery reel 39 is applied in its place, and during application of the second protective sheet recovery reel 39, the full protective sheet recovery reel 39 is replaced with an empty protective sheet recovery reel 39. The two protective sheet recovery reels 39 positioned below the MEA 1 in FIG. 5A are used similarly.

The MEA 1 is fed from the MEA supply portion 13 to the GDL attachment unit 3 under the tension applied by the MEA traction roller pair 15 and the MEA tensioner 14. The aforementioned optical sensor 26 is provided between the MEA supply portion 13 and the GDL attachment unit 3.

Returning to FIG. 1A, the GDL attachment unit 3 comprises an annular GDL conveyor 16, a GDL supply portion 17, a GDL attachment portion 18, and a hot press 19, all of which are disposed on both sides of the MEA 1.

Figure 7:
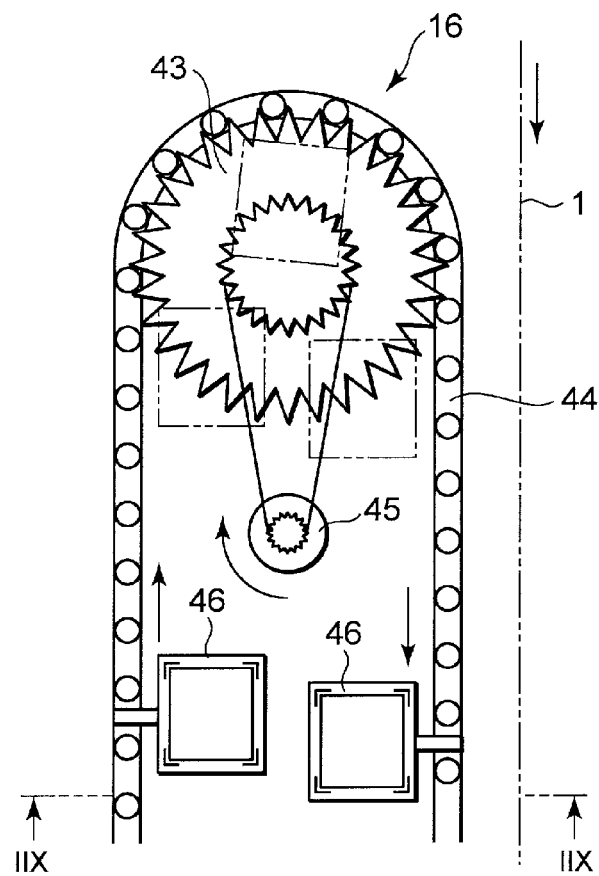
FIG. 7 is a principal plan view of a gas diffusion layer (GDL) conveyor provided in the fuel cell manufacturing device.

Referring to FIG. 7, the GDL conveyor 16 comprises a chain 44 wrapped around a pair of chain wheels 43. One of the chain wheels 43 is driven to rotate by a servo motor 45. A plurality of GDL conveyance pallets 46 are attached to the chain 44. As shown in the figure, the GDL conveyor 16 is disposed such that the linear portions of an elliptical track formed by the chain 44 are parallel to the conveyed MEA 1.

The displacement speed of the chain 44 is controlled to match the displacement speed of the MEA 1.

Figure 8:
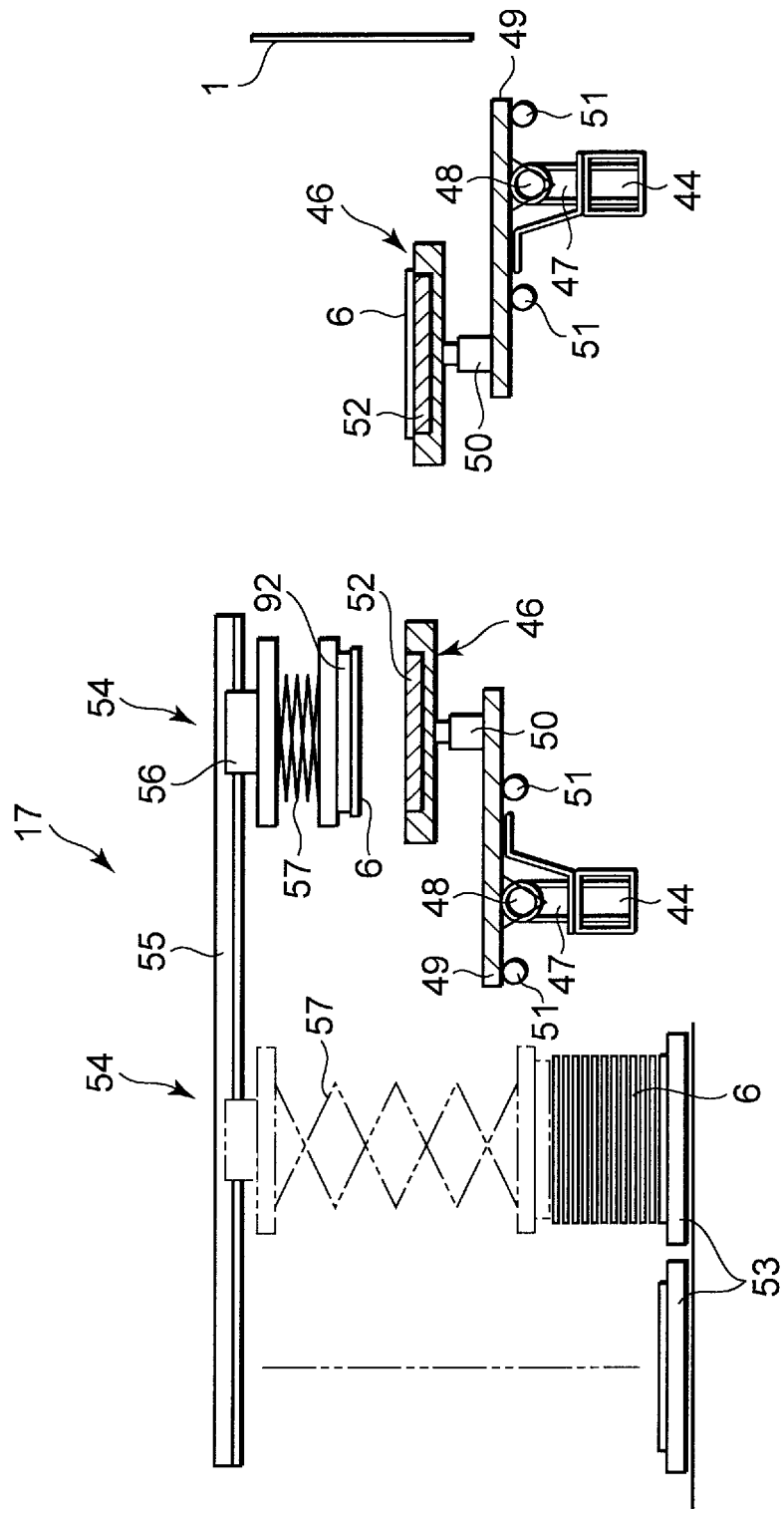
FIG. 8 is a side view of the GDL conveyor and a GDL supply portion seen from the direction of IIX-IIX in FIG. 7.

Referring to FIG. 8, the GDL conveyance pallet 46 is supported by a post 47, which is fixed to the chain 44, via a pin 48, a holding arm 49, and a telescopic cylinder 50. The holding arm 49 is rotatable about the pin 48. The telescopic cylinder 50 is provided in an upright manner on the inner peripheral end of the holding arm 49 in relation to the track formed by the GDL conveyor 16. A suction pad 52 is fixed to the tip end of the telescopic cylinder 50. The suction pad 52 is constituted by a vacuum actuator which holds and releases the GDL 6 in accordance with a signal.

The GDL conveyor 16 comprises a pair of pallet holding guides 51 which are parallel to the chain 44. The pallet holding guides 51 contact the lower surface of the GDL conveyance pallet 46, which moves together with the chain 44, and thus hold the GDL conveyance pallet 46 horizontally. One of the pallet holding guides 51 has a discontinuous portion in a parallel position to the MEA 1.

Figure 9:
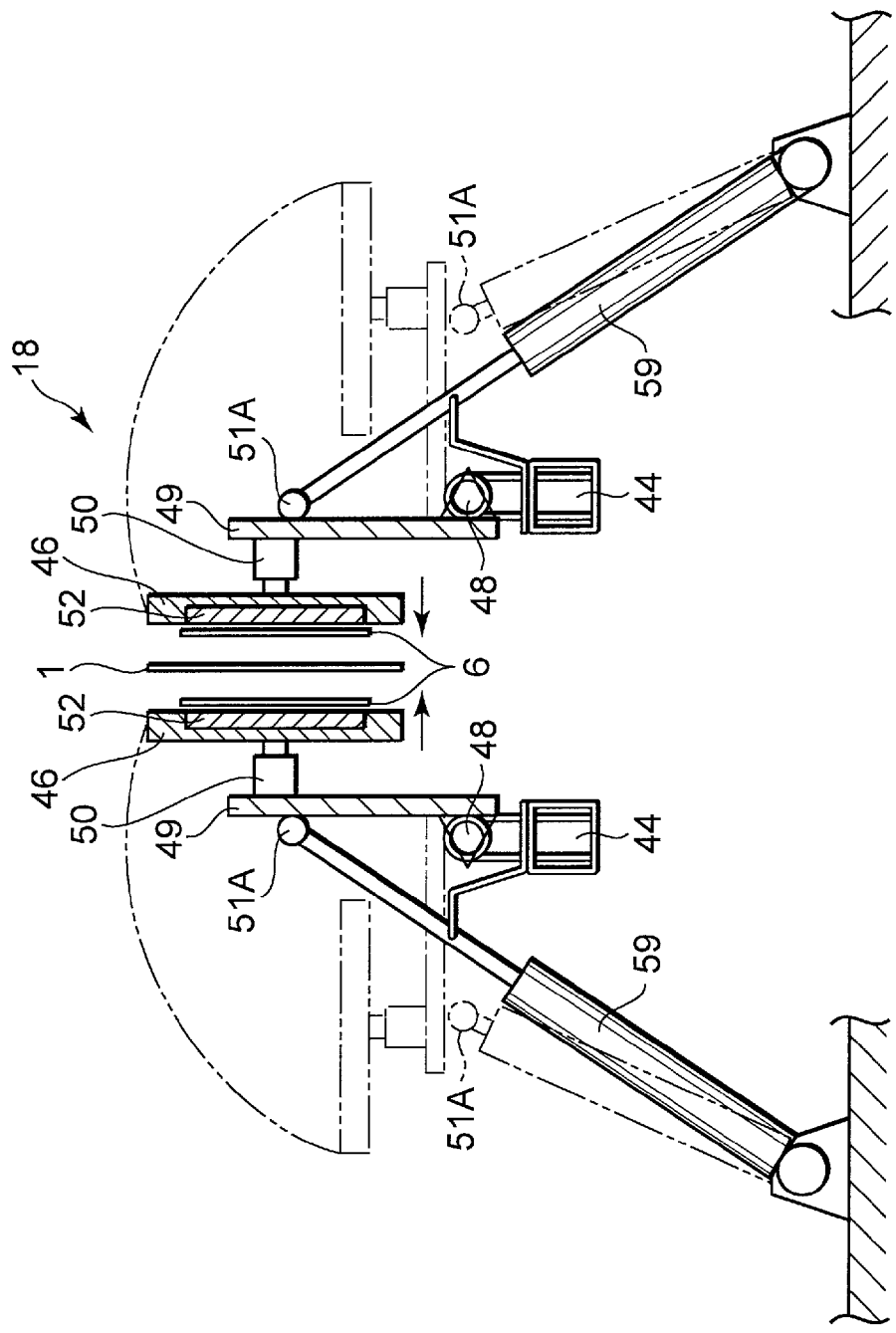
FIG. 9 is a side view of a GDL attachment portion of the fuel cell manufacturing device, seen from an MEA movement direction.

Referring to FIG. 9, the GDL attachment portion 18 comprises a mobile guide 51A which is fitted into the aforementioned notch. The mobile guide 51A is attached to the tip end of a rising cylinder 59 supported on a floor surface via a pin. As shown by the chain line in the figure, the rising cylinder 59 holds the GDL conveyance pallet 46 horizontally, in a similar manner to the pallet holding guide 51, when in a contracted position. When in an expanded position, the rising cylinder 59 rotates the GDL conveyance pallet 46 about the pin 48 to a vertical position, as shown by the solid line in the figure, via the mobile guide 51A. It should be noted that the discontinuous portion and the mobile guide 51A are formed in a section extending from the GDL attachment portion 18 to directly before the hot press 19.

The GDL 6, which is held on the suction pad 52 of the GDL conveyance pallet 46, is supported in an erect position facing the MEA 1 following expansion of the rising cylinder 59. By causing the telescopic cylinder 50 to expand in this state, the GDL 6 is pressed against the MEA 1. As shown in the figure, the GDL attachment portion 18 causes the rising cylinders 59 on either side of the MEA 1 to expand synchronously, and also causes the telescopic cylinders 50 on either side of the MEA 1 to expand synchronously, and thus the GDL 6 is pressed against both sides of the MEA 1 simultaneously. The surface of the GDL 6 that is joined to the MEA 1 is coated with an electrolyte liquid and dried in advance. Once the GDL 6 has been pressed onto the MEA 1, the suction pad 52 is withdrawn and the rising cylinder 59 and telescopic cylinder 50 are caused to contract such that the GDL conveyance pallet 46 rotates back to the horizontal position. The GDL 6, which is adhered to the MEA 1 by the adhesive strength of the electrolyte liquid, is then conveyed to the hot press 19 together with the MEA 1.

Figure 10:
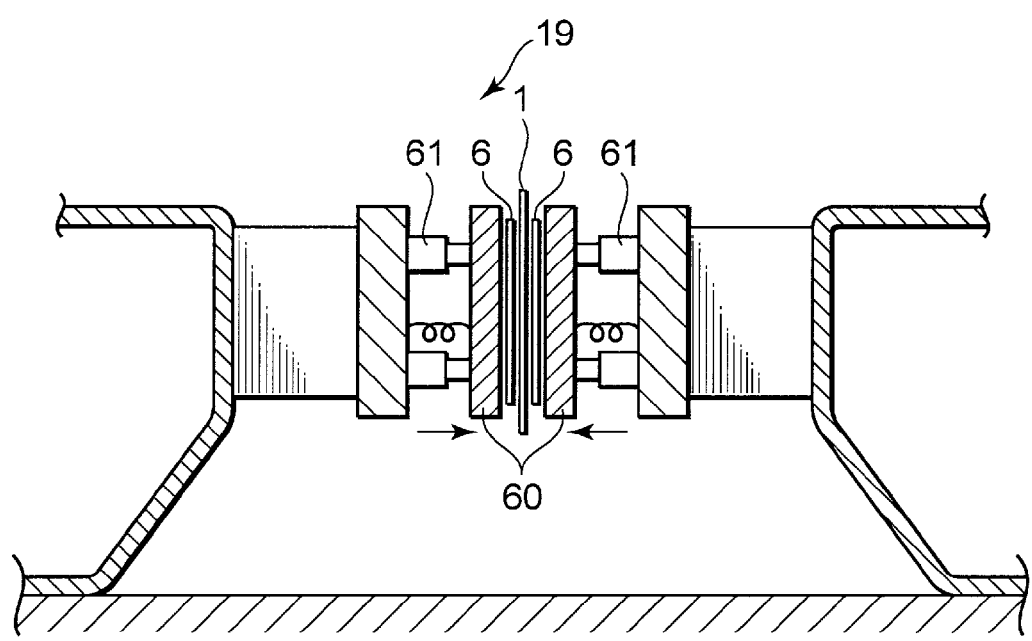
FIG. 10 is a side view of a hot press provided in the fuel cell manufacturing device, seen from the MEA movement direction.

Referring to FIG. 10, the interior of the hot press 19 is provided with a pair of press plates 60 pushed out toward the MEA 1 from either side of the MEA 1. The press plates 60 are each supported on the tip end of a telescopic cylinder 61. The press plates 60 are maintained within a temperature range of 80 to 150 degrees centigrade by a heater. When the telescopic cylinders 61 are caused to expand, the press plates 60 are both pressed against the GDL 6 adhered to each surface of the MEA 1 from the outside, whereby the MEA 1 and GDL 6 are thermally compressed. By means of this thermal compression, the GDL 6, which was previously adhered to each surface of the MEA 1 by the adhesive strength of the electrolyte alone, is integrated with the MEA 1.

Returning to FIG. 1A, the GDL 6 is supplied to the GDL conveyance pallet 46 by the GDL supply portion 17, which is positioned on the opposite side of the track formed by the chain 44 to the GDL attachment portion 18.

Returning to FIG. 8, the GDL supply portion 17 comprises an overhead transfer device 54 which transports the GDL 6 to the GDL conveyance pallet 46 from above, and a pair of GDL supply pallets 53. The GDL 6, which has been coated with an electrolyte liquid and dried in advance, is stacked on the GDL supply pallet 53. In this state, the GDL supply pallet 53 is conveyed from the exterior to a predetermined position on the outside of the track formed by the chain 44.

The transfer device 54 comprises a conveyance rail 55 extending from the upper side of the GDL supply pallet 53 to the upper side of the GDL conveyance pallet 46, a self-propelled rotor 56 which engages with the conveyance rail 55, and an alighting portion 57 attached to the rotor 56. The alighting portion 57 is a telescopic member having a suction pad 92, which is constituted similarly to the suction pad 52, attached to its lower end. The alighting portion 57 expands and contracts in accordance with an input signal, and causes the suction pad 92 to hold and release the GDL 6 in accordance with another input signal.

As shown by the double-dotted line in the figure, the transfer device 54 moves the alighting portion 57 above the supply pallet 53 and causes the alighting portion 57 to expand such that the uppermost GDL 6 stacked on the supply pallet 53 is sucked up by the suction pad 92 on the lower end of the alighting portion 57. The alighting portion 57 is then caused to contract while holding the GDL 6, whereupon the rotor 56 is caused to travel to the upper side of the GDL conveyance pallet 46, as shown by the solid line in the figure. The alighting portion 57 is then caused to expand again, whereupon the suction pad 92 releases the GDL 6 such that the GDL 6 is placed on the suction pad 52 of the GDL conveyance pallet 46. Then, with the GDL 6 held by the suction pad 52, the GDL conveyance pallet 46 conveys the GDL 6 to the GDL attachment unit 18 in accordance with the displacement of the chain 44.

The MEA 1, which is integrated with the GDL 6 in the GDL attachment unit 3 as described above, then passes through the MEA tensioner 14 to reach the separator attachment unit 4.

Returning to FIG. 1A, the separator attachment unit 4 comprises an annular separator conveyor 20, a separator supply portion 21, a sealing agent application portion 22 for applying a sealing agent to the separator 7 on the separator conveyor 20, a separator attachment portion 23, and a drying oven 24, all of which are disposed on both sides of the MEA 1.

Figure 11:
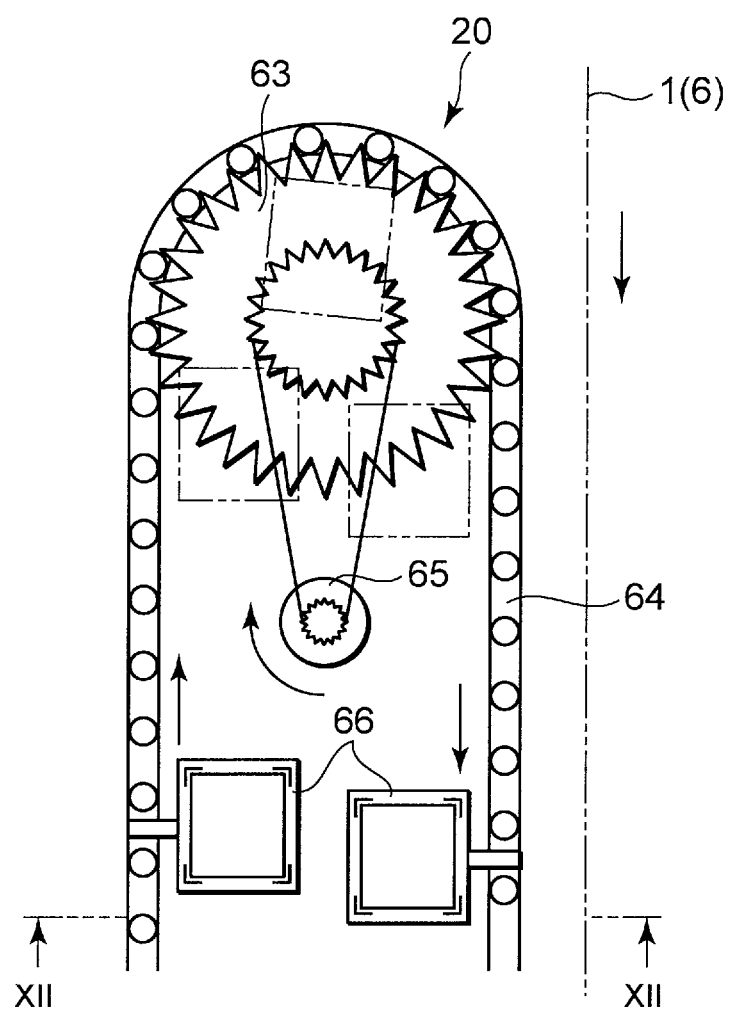
FIG. 11 is a principal plan view of a separator conveyor provided in the fuel cell manufacturing device.

Referring to FIG. 11, the constitution of the separator conveyor 20 is similar to the constitution of the GDL conveyor 16, comprising a chain 64 wrapped around a pair of chain wheels 63 and a servo motor 65 for driving the chain wheels 63. On the basis of this constitution, the chain 64 moves in synchronization with the displacement of the MEA 1. A plurality of separator conveyance pallets 66 are attached to the chain 64.

Figure 12:
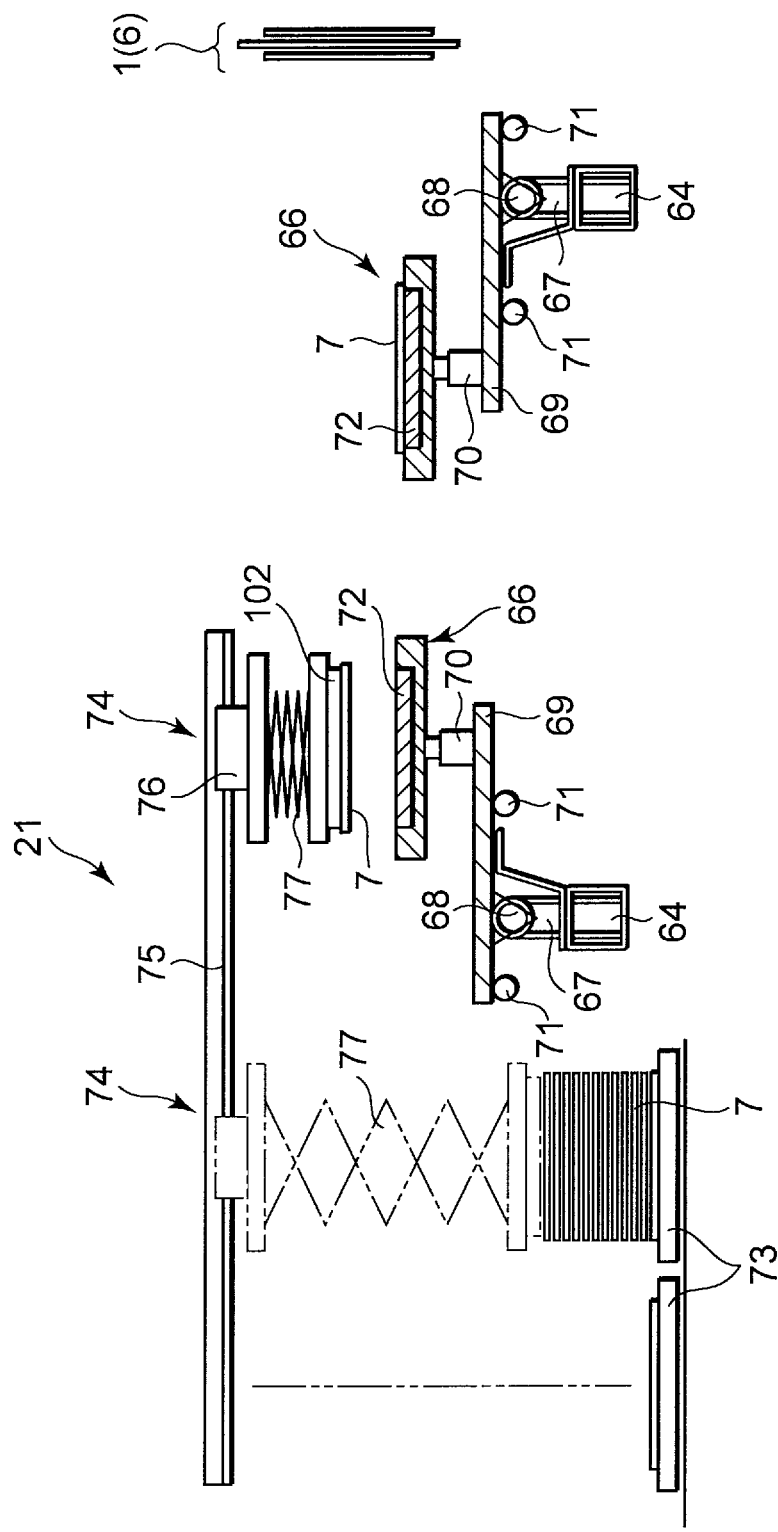
FIG. 12 is a side view of the separator conveyor and a separator supply portion seen from the direction of XII-XII in FIG. 11.

Referring to FIG. 12, the separator conveyance pallet 66 is supported by a post 67, which is fixed to the chain 64, via a pin 68, a holding arm 69, and a telescopic cylinder 70. The holding arm 69 is rotatable about a pin 98. The telescopic cylinder 70 is provided in an upright manner on the inner peripheral end of the holding arm 69 in relation to the track formed by the separator conveyor 20. A suction pad 72 is fixed to the tip end of the telescopic cylinder 70. The suction pad 72 is constituted by a vacuum actuator which holds and releases the separator 7 in accordance with a signal.

The separator conveyor 20 comprises a pair of pallet holding guides 71 which are parallel to the chain 64. The pallet holding guides 71 contact the lower surface of the separator conveyance pallet 66, which moves together with the chain 64, and thus hold the separator conveyance pallet 66 horizontally. One of the pallet holding guides 71 has a discontinuous portion in a parallel position to the MEA 1.

Figure 14:
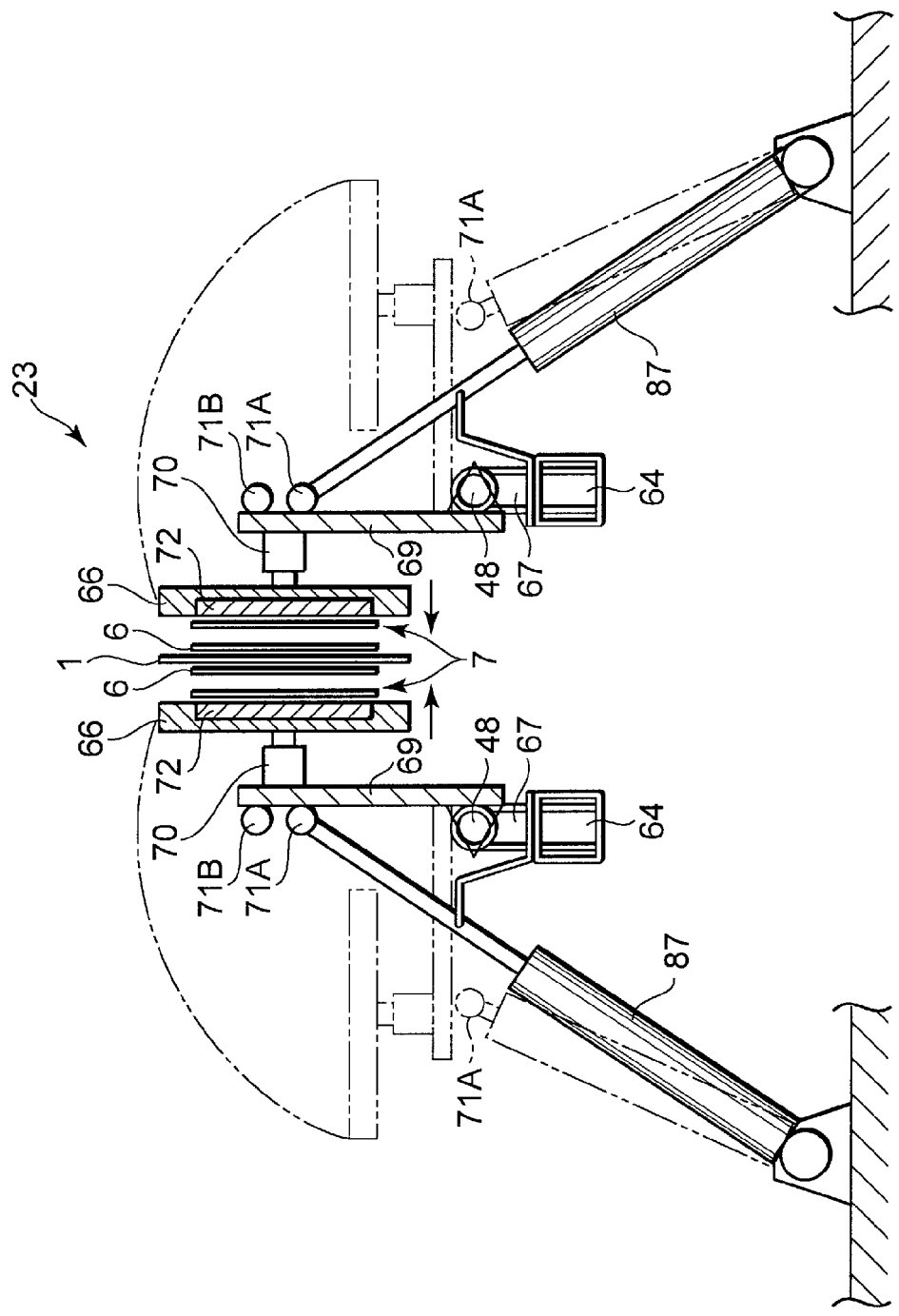
FIG. 14 is a side view of a separator attachment portion of the fuel cell manufacturing device, seen from the MEA movement direction.

Referring to FIG. 14, the separator attachment portion 23 comprises a mobile guide 71A which is disposed in a position corresponding to the discontinuous portion of the pallet holding guide 71. The mobile guide 71A is attached to the tip end of a rising cylinder 87 supported on a floor surface via a pin. As shown by the chain line in the figure, the rising cylinder 87 holds the separator conveyance pallet 66 horizontally, in a similar manner to the pallet holding guide 71, when in a contracted position. When in an expanded position, the rising cylinder 87 rotates the separator conveyance pallet 66 about the pin 68 to a vertical position, as shown by the solid line in the figure, via the mobile guide 71A.

The separator 7, which is held on the suction pad 72 of the separator conveyance pallet 66, is supported in an erect position facing the MEA 1 following expansion of the rising cylinder 87. By causing the telescopic cylinder 70 to expand in this state, the separator 7 is pressed against the MEA 1. As shown in the figure, the separator attachment portion 23 causes the rising cylinders 87 on either side of the MEA 1 to expand synchronously, and also causes the telescopic cylinders 70 on either side of the MEA 1 to expand synchronously, and thus the separators 7 are pressed against the two surfaces of the MEA 1 simultaneously. An outer peripheral portion of the separator 7 facing the MEA 1 is coated with a sealing agent in advance by the sealing agent application portion 22.

The drying oven 24 is adjacent to the separator attachment portion 23 on the downstream side of the movement direction of the MEA 1.

Figure 15:
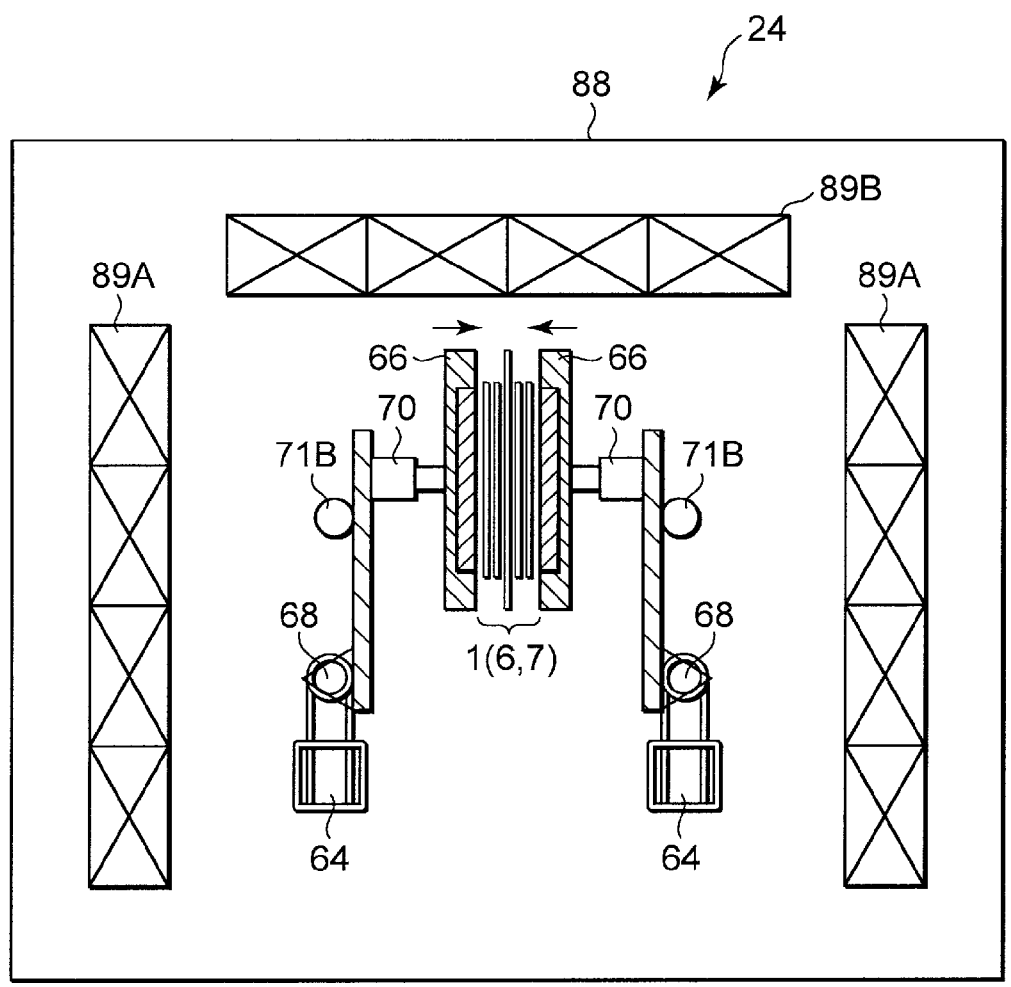
FIG. 15 is a transverse sectional view of a drying oven provided in the fuel cell manufacturing device.

Referring to FIG. 15, the drying oven 24 is provided in a drying oven booth 88 formed to cover a partial section of the chain 64. A fixing guide 71B which holds the separator conveyance pallet 66 in the same vertical position as the expanded rising cylinder 87 is provided in the drying oven booth 88. When the separator conveyor 20 conveys the separator conveyance pallets 66 integrally with the MEA 1 from the separator attachment portion 23 to the drying oven 24, the separator conveyance pallets 66 are moved to the inside of the fixing guides 71B from the inside of the mobile guides 71A while continuing to sandwich the separators 7 and the MEA 1. Once the separator conveyance pallets 66 have moved completely to the inside of the fixing guides 71B, the rising cylinders 87 contract such that the mobile guides 71A are once again positioned alongside the pallet holding guides 71.

Three far infrared heaters 89A are provided in the drying oven booth 88 above and on the two sides of the separator conveyance pallets 66 sandwiching the MEA 1 together with the separators 7. The far infrared heaters 89A maintain the internal temperature of the drying oven booth 88 within a range of 80 to 200 degrees centigrade. As a result of being heated in the drying oven 24, the sealing agent on the outer peripheral portion of the separators 7 is hardened such that the separators 7 are fixed to the MEA 1. The GDLs 6 are previously fixed integrally to the two surfaces of the MEA 1 in the GDL attachment unit 3, and hence strictly speaking, the separators 7 are fixed to the GDLs 6. In other words, as a result of this heating process, lamination of the fuel cell is completed.

The fixing guide 71B gradually recedes from the MEA 1 to the downstream side of the drying oven 24 in the movement direction of the separator conveyance pallet 66, finally reaching the pallet holding guide 71 which maintains the separator conveyance pallet 66 in a horizontal state.

Returning to FIG. 1A, the separator 7 is supplied to the separator conveyance pallet 66 by the separator supply portion 21, which is positioned on the opposite side of the track formed by the chain 64 to the separator attachment portion 23.

Returning to FIG. 12, the separator supply portion 21 is constituted similarly to the GDL supply portion 17. More specifically, the separator supply portion 21 comprises an overhead transfer device 74 and a pair of separator supply pallets 73. The separator supply pallets 53 are conveyed from the exterior to a predetermined position on the outside of the track formed by the chain 64 with the separators 7 stacked thereon.

The transfer device 74 comprises a conveyance rail 75, a self-propelled rotor 76 which engages with the conveyance rail 75, and an alighting portion 77 attached to the rotor 76. The alighting portion 77 is a telescopic member having a suction pad 102, which is constituted similarly to the suction pad 72, attached to its lower end. The alighting portion 77 expands and contracts in accordance with an input signal, and causes the suction pad 102 to hold and release the separator 7 in accordance with another input signal. Conveyance of the separator 7 from the separator supply pallet 53 to the separator conveyance pallet 66 is performed by the transfer device 74 in a similar manner to conveyance of the GDL 6 from the GDL supply pallet 53 to the GDL conveyance pallet 46 by the transfer device 54.

Returning to FIG. 1A, the sealing agent application portion 22 is provided adjacent to the separator supply portion 21 on the downstream side of the track formed by the chain 64.

Figure 13:
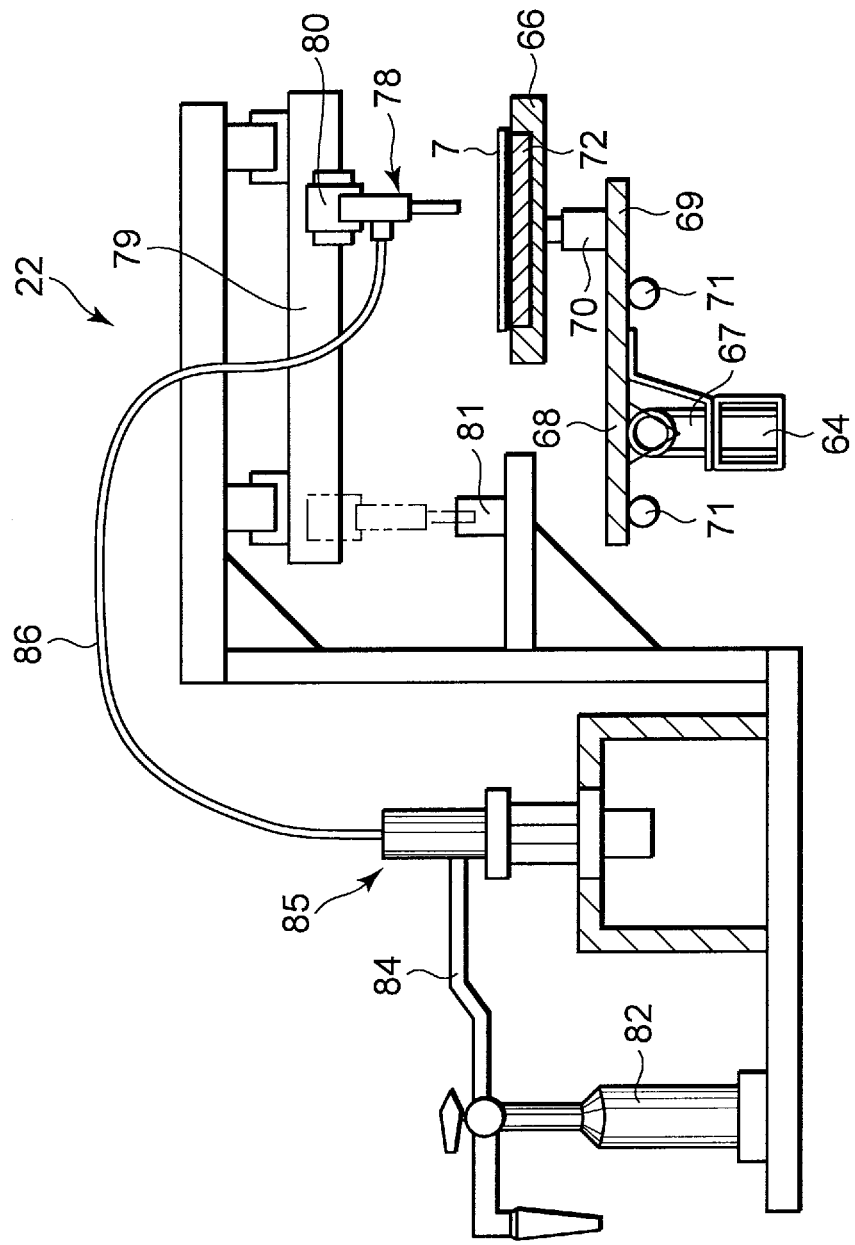
FIG. 13 is a side view of a sealing agent application portion of the fuel cell manufacturing device.

Referring to FIG. 13, the sealing agent application portion 22 comprises an application nozzle 78 facing the separator 7, which is conveyed on the separator conveyance pallet 66 in a horizontal state, from above. The application nozzle 78 is disposed on the tip end of a telescopic cylinder 80 which is supported so as to expand and contract in a vertical direction on an X-Y robot 79 capable of displacement in a horizontal direction within a predetermined operating area above the separator conveyance pallet 66. The X-Y robot 79 moves the application nozzle 78 between the operating area and a standby position 81 to the side thereof.

The sealing agent application portion 22 comprises a cartridge 82 storing the sealing agent, which is pressurized by a pump, a primary pipe 84 which pumps sealing agent from the cartridge 82 to a constant flow device 85, and a secondary pipe 86 which supplies the sealing agent measured by the constant flow device 85 to the application nozzle 78. The sealing agent application portion 22 applies the sealing agent through the application nozzle 78 to a predetermined position, including the outer peripheral portion, of the separator 7 that is conveyed underneath the application nozzle 78 by the separator conveyance pallet 66.

Next, the functions of the controller 5 which controls the MEA conveyance unit 2, GDL attachment unit 3, and separator attachment unit 4 will be described.

Figure 2:
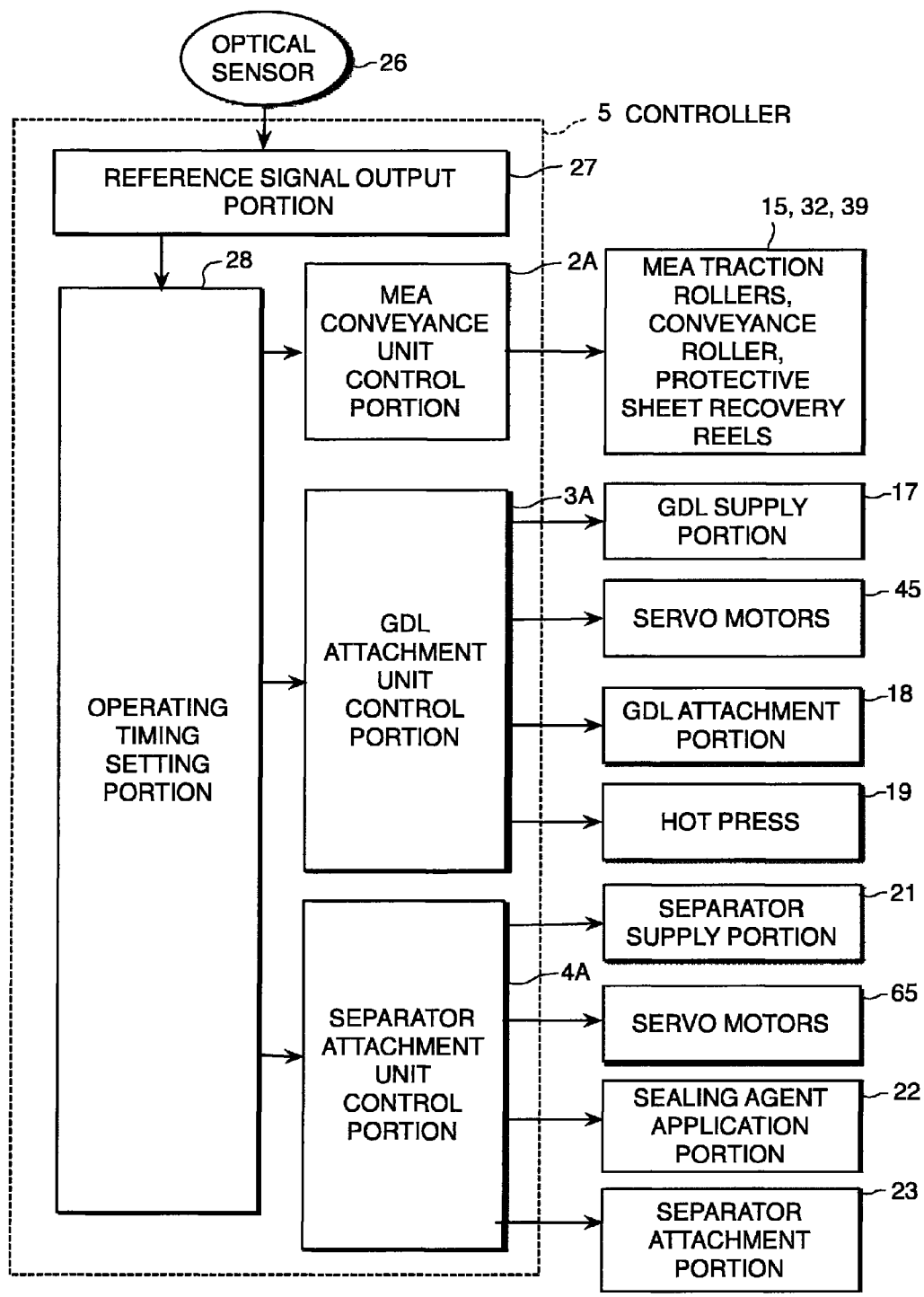
FIG. 2 is a block diagram illustrating the constitution of a controller of the fuel cell manufacturing device.

Referring to FIG. 2, the controller 5 controls the conveyance speed and conveyance tact of the MEA 1 by the MEA conveyance unit 2 on the basis of input signals from the optical sensor 26 which detects the conveyance holes 10 and marks 11 on the MEA 1. More specifically, the controller 5 controls rotation of the servo motor 36 which drives the conveyance roller 32, the traction rollers 15, and the protective sheet recovery reels 39. Also on the basis of the input signals from the optical sensor 26, the controller 5 controls the operation timing of the GDL supply portion 17, the servo motor 45 of the GDL conveyor 16, the GDL attachment portion 18, and the hot press 19 in the GDL attachment unit 3. The controller 5 also controls the operation timing of the pallet supply portion 21, the servo motor 65 of the separator conveyor 20, the sealing agent application portion 22, and the separator attachment portion 23 in the separator attachment unit 4 on the basis of input signals from the optical sensor 26.

The controller 5 is constituted by a microcomputer comprising a central processing unit (CPU), read-only memory (ROM), random access memory (RAM), and in input/output interface (I/O interface). The controller 5 may be constituted by a plurality of microcomputers.

To perform this control, the controller 5 comprises a reference signal output portion 27, an operating timing setting portion 28, an MEA conveyance unit control portion 2A which controls the various devices of the MEA conveyance unit 2, a GDL attachment unit control portion 3A which controls the operation timing of the various devices of the GDL attachment unit 3, and a separator attachment unit control portion 4A which controls the various devices of the separator attachment unit 4. Each portion denotes a function of the controller 5 as a virtual unit, and does not exist physically.

The reference signal output portion 27 generates a signal corresponding to the actual conveyance speed of the MEA 1 from a signal input into the controller 5 by the optical sensor 26 on the basis of the conveyance holes 10. The reference signal output portion 27 also detects the position of the catalyst layer 12, shown by the broken line in FIG. 3, from a signal input into the controller 5 by the optical sensor 26 on the basis of the optical marks 11, and generates a reference position signal corresponding to the detected position.

The operation timing setting portion 28 generates an operation timing signal for various actuators from the reference position signal and the actual conveyance speed of the MEA 1. The distance from the optical sensor to the various actuators is known in advance, and therefore the timing for operating each actuator can be determined through calculation from this distance, the reference position signal, and the actual conveyance speed of the MEA 1.

An operation timing signal relating to the GDL attachment unit 3 includes the operation timing of the rising cylinder 59 and suction pad 52 for adhering the GDL 6 directly on top of the catalyst layer 12 on the MEA 1, the operation timing of the telescopic cylinder 61 for pressing the press plates 60 against the GDLs 6 on the two surfaces of the MEA 1, and the operation timing of the rotor 56, alighting portion 57, and suction pallet 52 for supplying the GDL 6 from the GDL supply pallet 53 to the GDL conveyance pallet 46.

An operation timing signal relating to the separator attachment unit 4 includes the operation timing of the rising cylinder 87 and suction pad 72 for adhering the separator 7 directly on top of the GDL 6, the operation timing of the rotor 76, alighting portion 77, and suction pallet 102 for supplying the separator 7 from the separator supply pallet 73 to the separator conveyance pallet 66, and the operation timing of the X-Y robot 79, telescopic cylinder 80 and application nozzle 78 for applying the sealing agent correctly to the peripheral edge portion of the separator 7.

The MEA conveyance unit control portion 2A feedback-controls the rotation speed of the conveyance roller 32, the MEA traction rollers 15, and the protective sheet recovery reels 39 on the basis of the actual conveyance speed signal of the MEA 1 in order to realize a preset target conveyance speed of the MEA 1.

The GDL attachment unit control portion 3A controls the rotation speed of the servo motor 45 on the basis of the actual conveyance speed signal of the MEA 1 such that the speed of the two GDL conveyors 16 is equal to the actual conveyance speed of the MEA 1. The GDL attachment unit control portion 3A also controls the GDL supply portion 17, GDL attachment portion 18, and hot press 19 on the basis of the operation timing signal relating to the GDL attachment unit 3, generated by the operating timing setting portion 28.

The separator attachment unit control portion 4A controls the rotation speed of the servo motor 65 on the basis of the actual conveyance speed signal of the MEA 1 such that the speed of the two separator conveyors 20 is equal to the actual conveyance speed of the MEA 1. The separator attachment unit control portion 4A also controls the separator supply portion 21, sealing agent application portion 22, and separator attachment portion 23 on the basis of the operation timing signal relating to the separator attachment unit 4, generated by the operating timing setting portion 28.

In this fuel cell manufacturing device, the MEA 1 is formed with the conveyance holes 10 which engage with the projections on the conveyance roller 32 and the marks 11 indicating the position of each catalyst layer 12, and on the basis of a unique signal output by the optical sensor 26 every time the hole 10 and the mark 11 passes thereby, the actual conveyance speed of the MEA 1 and the position of the catalyst layer 12 is detected. As a result, the speed of the GDL conveyors 16 and separator conveyors 20 can be matched precisely to the actual conveyance speed of the MEA 1. Furthermore, the operation timing of the various actuators in the GDL attachment unit 3 and separator attachment unit 4 can be set accurately from the position of the catalyst layer 12 and the actual conveyance speed of the MEA 1. Thus the GDL 6 and the separator 7 can be adhered to the MEA 1 with a high degree of positional accuracy.

In this fuel cell manufacturing device, the GDL 6 is adhered to the MEA 1 while traveling at the same speed as the MEA 1, and the separator 7 is also adhered to the MEA 1 while traveling at the same speed as the MEA 1. As a result, fuel cells can be manufactured efficiently while operating the MEA conveyance unit 2 continuously.

Next, referring to FIGS. 16A to 16C, a second embodiment of this invention will be described.

In this embodiment, the separator 7 is formed on a conveyance film 95. The conveyance film 95 is formed with similar conveyance holes 10A to those formed in the MEA 1.

The fuel cell manufacturing device comprises an MEA conveyance unit 200 and a pair of separator conveyance units 40 disposed on either side thereof.

In the MEA conveyance unit 200, the MEA 1 is fed from the roll 30 of the MEA 1, which is wound around the reel 9, by a conveyance roller 32. Similarly to the first embodiment, catalyst layers are formed on the MEA 1 at fixed intervals and the conveyance holes 10 are formed at fixed intervals on the two outer sides of the catalyst layer. In contrast to the first embodiment, however, a protective sheet is not adhered to the MEA 1 as it passes the conveyance roller 132. Projections which engage with the holes 10 are formed on the outer periphery of the conveyance roller 132.

The separators 7 are adhered in advance to the film 95, which comprises the conveyance holes 10A on both sides and at fixed intervals similarly to the holes 10 formed on the MEA 1, at equal intervals to the catalyst layers formed on the MEA 1.

The separator conveyance unit 40 comprises a conveyance roller 132A which comprises similar projections to those formed on the conveyance roller 132 and rotates in synchronization with the conveyance roller 132. The conveyance roller 132A conveys the film 95 by rotating while the projections 132B engage with the holes 10A. The sealing agent application nozzle 78 is provided upstream of the conveyance roller 132A in the movement direction of the film 95. Similarly to the first embodiment, the sealing agent application nozzle 78 applies the sealing agent to a predetermined position, including the outer peripheral portion, of the separator 7.

Thus the film 95 adhered with the separators 7 is supplied to the two sides of the MEA 1. The separators 7 on the film 95 are pressed onto the MEA 1 by a pair of joining rollers 133.

Figure 16C:
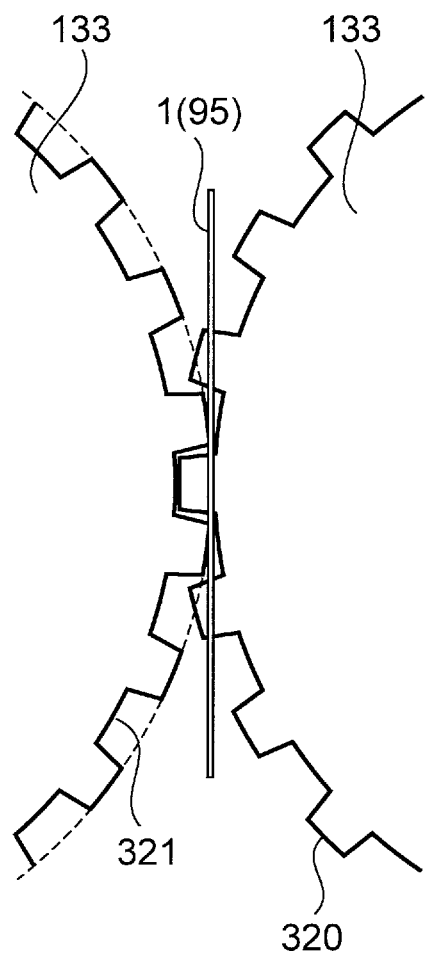

As shown in FIG. 16C, projections 320 which penetrate the conveyance holes 10 and the holes 10A are formed on the outer periphery of one of the pair of joining rollers 133. The other joining roller 133 is formed with recessed portions 321 which receive the projections 320. By means of the engagement between the projections 320 penetrating the holes 10 and holes 10A and the recessed portions 321, the pair of joining rollers 133 press the separators 7 from both sides in a position corresponding accurately to the catalyst layers 12 on the MEA 1. Thermal compression rollers 94 are provided downstream of the joining rollers 133 in the movement direction of the MEA 1. The thermal compression rollers 94 apply a compressive force and heat to the separators 7 sandwiching the MEA 1 from the outside such that the separators 7 are attached to the MEA 1 even more securely, the sealing agent applied to the separators 7 is dried, and the separators 7 are adhered completely to the MEA 1. Following the processing described above, the film 95 is peeled away from the separators 7, whereby the fuel cell is complete. It should be noted that in this embodiment, a GDL is not used, but by adhering GDLs onto the film 95 in place of the separators 7, the device may be used to attach a GDL to the MEA 1.

According to this embodiment, the separator 7 is adhered to the film 95 and the projections 320 formed on the joining roller 133 are caused to penetrate the holes 10 in the MEA 1 and the holes 10A in the film 95. As a result, positioning between the catalyst layer 12 on the MEA 1 and the separator 7 can be performed accurately at all times.

Next, referring to FIGS. 17A-28, a third embodiment of this invention will be described.

Figure 17A:
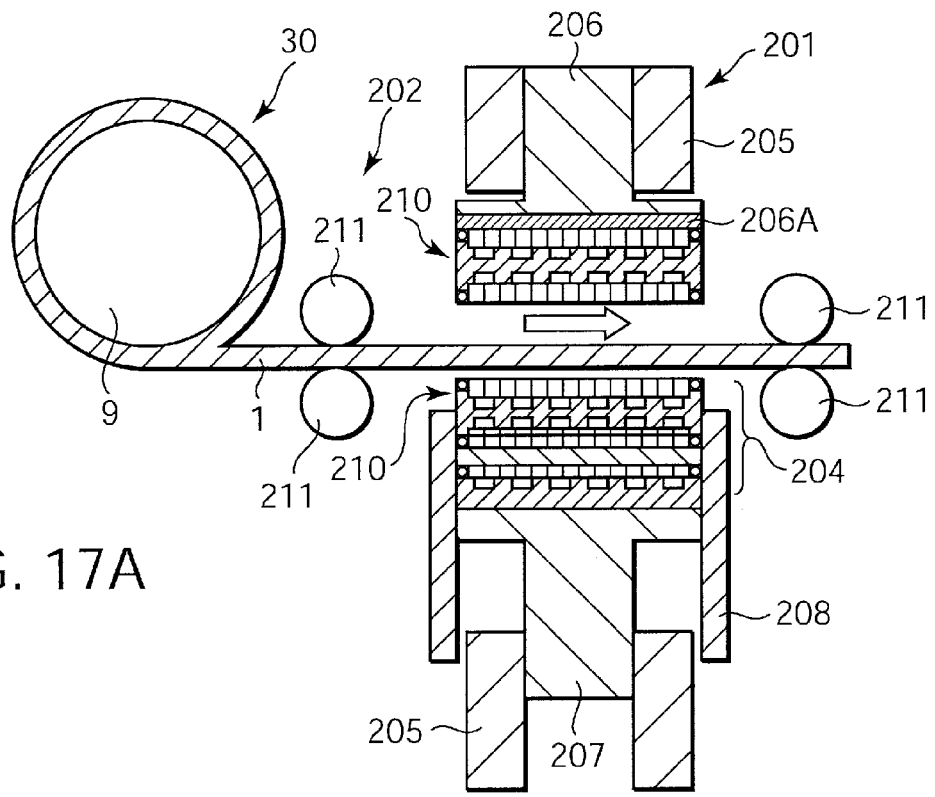
FIGS. 17A and 17B are schematic side views of a fuel cell manufacturing device according to a third embodiment of this invention.

First, referring to FIG. 17A, a fuel cell stack manufacturing device comprises a lamination unit 201, and an MEA conveyance unit 202 which supplies the lamination unit 201 with the MEA 1. The fuel cell manufacturing device further comprises a laminate supply unit 203 shown in FIG. 21, which supplies the lamination unit 201 with a laminate 210.

In the MEA conveyance unit 202, the MEA 1 is fed from the roll 30 of the MEA 1, which is wound around the reel 9, by two pairs of conveyance rollers 211 and supplied to the lamination unit 201.

Figure 18:
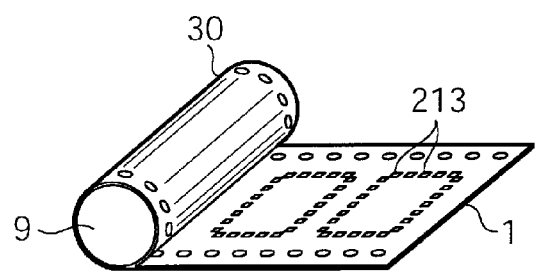
FIG. 18 is a perspective view of a membrane electrode assembly (MEA) roll according to the third embodiment of this invention.

Referring to FIG. 18, catalyst layers are formed on both surfaces of the MEA 1 in advance, and conveyance holes 212 are formed on both side portions of the MEA 1 at equal intervals in the lengthwise direction of the MEA 1. Furthermore, to assist the lamination unit 201 in cutting out the MEA 1, a rectangular perforation 213 is formed on the outer periphery of the catalyst layer.

Figure 17B:
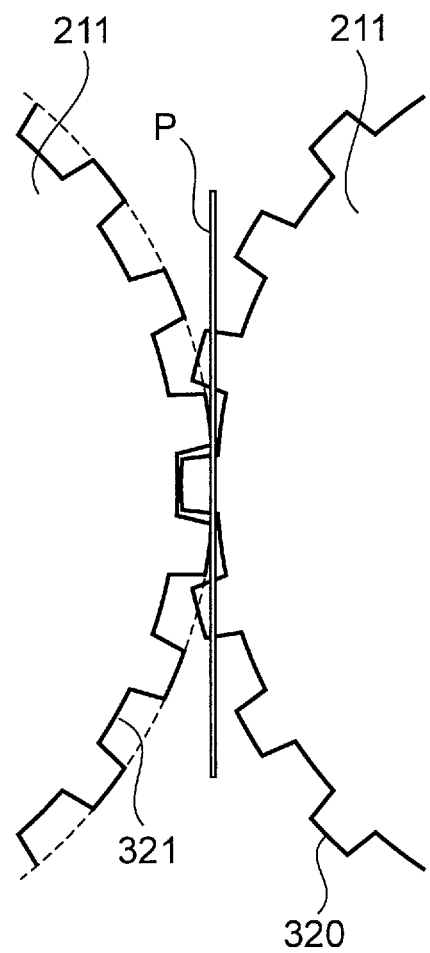

Referring to FIG. 17B, projections 320 which penetrate the conveyance holes 212 in the MEA 1 are formed on the outer periphery of one of each pair of conveyance rollers 211. The other conveyance roller 211 of each pair is formed with recessed portions 321 which receive the projections 320. By means of the engagement between the projections 320 penetrating the holes 10 and the recessed portions 321, the conveyance rollers 211 convey the MEA 1 to the lamination unit 201 accurately at a preset conveyance speed. The conveyance roller 211 pairs rotate in synchronization. The number of revolutions performed by the conveyance rollers 211 during one operation is set such that the MEA 1 moves by an equal distance to the interval of the perforation 213 during one operation.

Returning to FIG. 17A, the lamination unit 201 is positioned between the one pair of conveyance rollers 211 and the other pair of conveyance rollers 211.

The lamination unit 201 comprises frames 205 respectively facing the upper side and lower side of the MEA 1, which extends in a horizontal direction, between the two pairs of conveyance rollers 211. An elevatable upper member 206 is supported on the frame 205 on the upper side of the MEA 1. An elevatable lower member 207 is supported on the frame 205 on the lower side of the MEA 1. The lower member 207 supports previously laminated fuel cells 204 from below. The lower member 207 and the laminated fuel cells 204 are both housed inside a holding frame 208 which is fixed to the frame 205. The upper member 206 comprises a suction pad 206A which grips the laminate 210. A magnet chuck may be used instead of the suction pad 206A.

Figure 27:
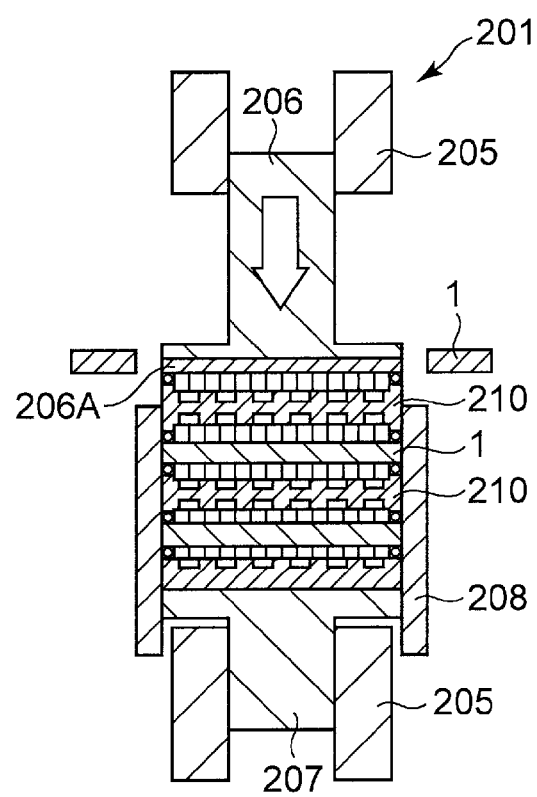
FIG. 27 is similar to FIG. 25, but shows a state in which the lamination unit has cut the MEA.

The upper member 206 ascends and descends between an elevated position shown in FIG. 17A and a lowered position shown in FIG. 27. The lower member 207 ascends and descends between an elevated position shown in FIG. 25 and a lowered position shown in FIG. 27. It should be noted that the lowered position of the upper member 206 and the elevated position of the lower member 207 are dependent on the thickness of the previously laminated fuel cells 204 in the holding frame 208.

Returning to FIG. 17A, the elevation stroke distance of the upper member 206 is set to a value obtained by adding to the thickness of the laminate 210 and MEA 1 a predetermined gap dimension set between the laminate 210 in the elevated position and the MEA 1 and a predetermined gap dimension set between the fuel cells 204 stacked on the lower member 207 and the MEA 1.

Returning to FIG. 27, the upper member 206 presses the laminate 210 against the MEA 1 such that the MEA 1 is cut out from the perforation 213 and punched downward.

Figure 19:
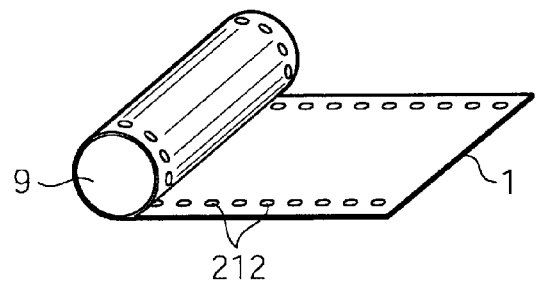
FIG. 19 is similar to FIG. 18, but shows an MEA without a perforation.
Figure 20:
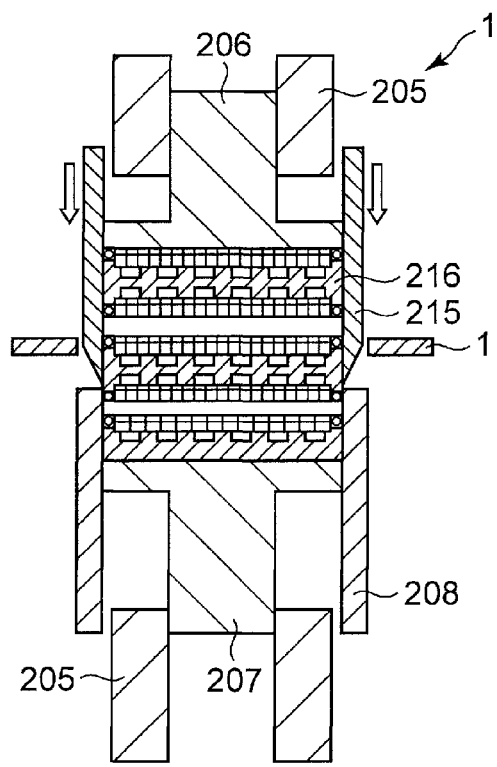
FIG. 20 is a side view of another lamination unit according to the third embodiment of this invention.

As shown in FIG. 19, the MEA 1 may be formed without the perforation 213 and instead, as shown in FIG. 20, a cutter 215 may be provided on the upper member 206 such that the MEA 1 is cut out when the upper member 206 descends.

Figure 22:
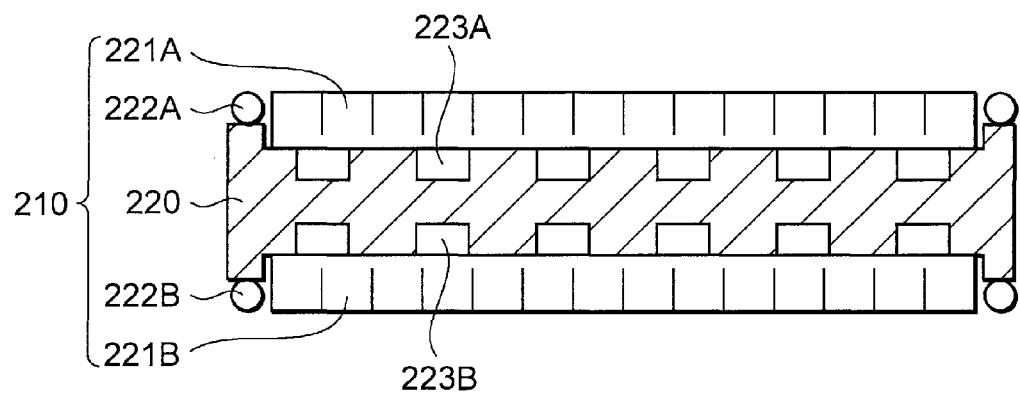
FIG. 22 is a longitudinal sectional view of a laminate according to the third embodiment of this invention.

Referring to FIG. 22, the laminate 210 is formed by adhering gas diffusion layers (GDLs) 221A and 221B to the respective surfaces of a separator 220 and applying sealing agent 222A and 222B to the outer periphery of the separator 220. The laminate 210 is assembled by a separate assembly device. Gas passages 223A and 223B are formed in both surfaces of the separator 220 in advance. A fuel cell stack is constituted by laminating the MEA 1 and the laminate 210 alternately. An end plate is disposed on each of the upper end and lower end of the fuel cell stack, and finally the fuel cell stack is fastened integrally by stud bolts penetrating the stack in a longitudinal direction and nuts. Accordingly, a laminate 210A shown in FIG. 23 is used in place of the laminate 210 shown in FIG. 22 on the lower end of the fuel cell stack shown in FIG. 17A.

Figure 23:
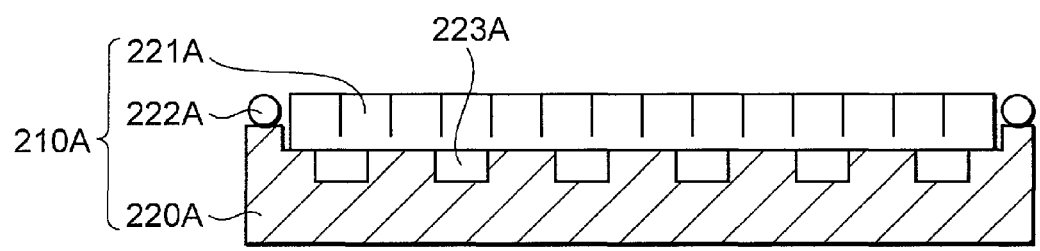
FIG. 23 is a longitudinal sectional view of another laminate according to the third embodiment of this invention.

Referring to FIG. 23, the laminate 210A is formed by adhering the GDL 221A to an end plate 220A formed with a gas passage 223A in the upper surface thereof, and applying the sealing agent 222A to the outer periphery of the end plate 220A. A laminate that is similar to the laminate 210A shown in FIG. 23 but reversed in the up-down direction is laminated onto the upper end of the fuel cell stack comprising a predetermined number of laminated fuel cells.

In this embodiment, the GDLs 221A and 221B are adhered to the separator 220, but the GDLs 221A and 221B may be formed on the surfaces of the MEA 1 in advance. In this case, the laminate 210 is constituted by the separator 220 and sealing agent 222A, 222B alone.

Figure 21:
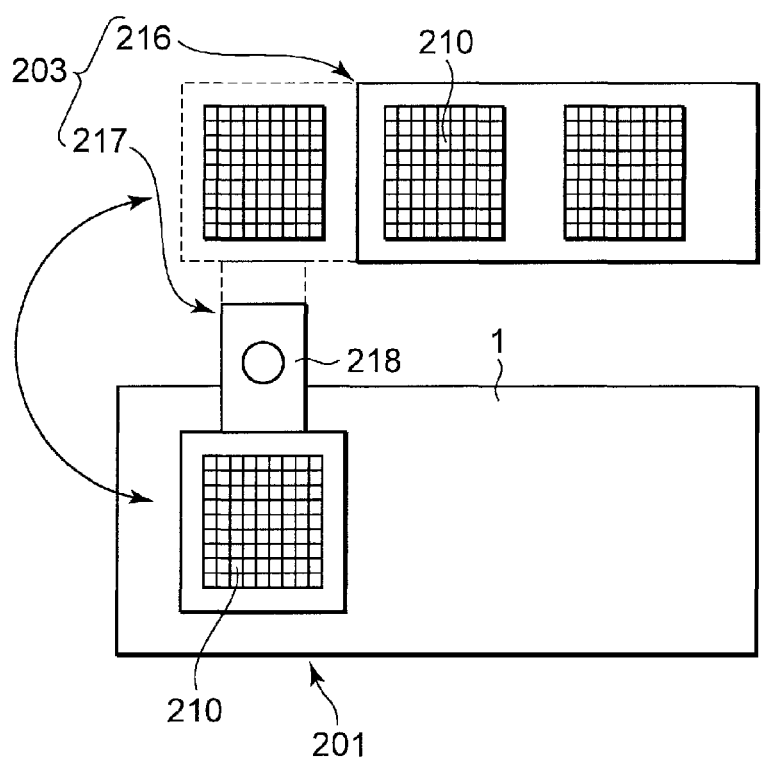
FIG. 21 is a plan view of a laminate supply unit according to the third embodiment of this invention.

Referring to FIG. 21, the laminate supply unit 203 comprises a conveyance pallet 216 and a mount portion 217. The conveyance pallet 216 carries a plurality of the laminates 210 to a predetermined position in the vicinity of the mount portion 217. The mount portion 217 comprises a revolving arm 218. The revolving arm 218 scoops up the laminate 210 from the conveyance pallet 216, revolves by substantially 180 degrees, and thus moves the laminate 210 directly beneath the suction pad 206A on the upper member 206. In this state, the upper member 206 descends and grips the laminate 210 using the suction pad 206A.

Figure 24:
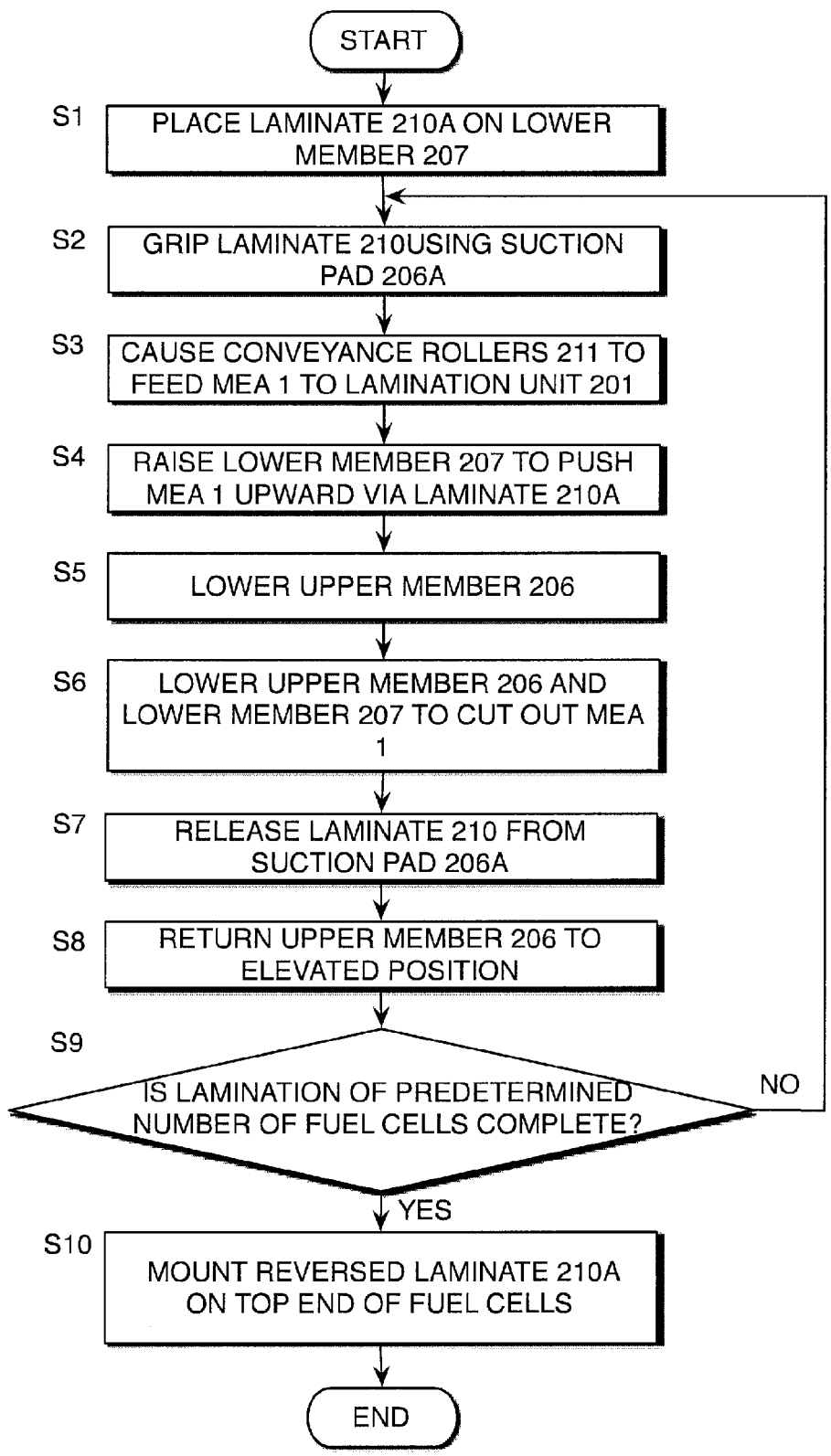
FIG. 24 is a flowchart illustrating a fuel cell stack manufacturing process performed by the fuel cell manufacturing device according to the third embodiment of this invention.

Next, referring to FIG. 24, an operational sequence of the fuel cell stack manufacturing device will be described.

First, in a step S1, the manufacturing device grips the laminate 210A shown in FIG. 23 using the suction pad 206A on the upper member 206 and places the laminate 210A on the lower member 207. At this time, a hole is formed in the MEA 1 positioned below the upper member 206 following cutting of the catalyst layer part thereof along the perforation 213 in the previous lamination operation. Therefore, the laminate 210A gripped by the suction pad 206A is placed on the lower member 207 through this hole.

Next, in a step S2, the manufacturing device grips the laminate 210 shown in FIG. 22 using the suction pad 206A on the upper member 206.

Next, in a step S3, the manufacturing device causes the conveyance rollers 211 to feed the MEA 1 from the roll 30 to the lamination unit 201.

Figure 25:
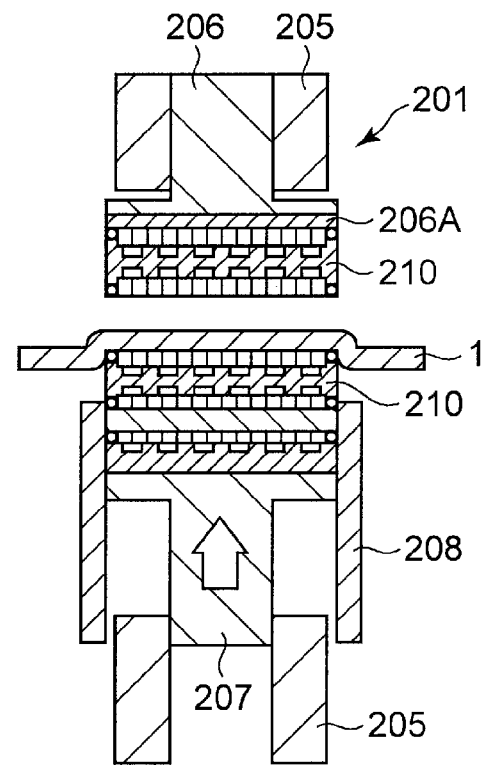
FIG. 25 is a side view of the lamination unit according to the third embodiment of this invention in a state where the lamination unit applies tension to the MEA.

Next, in a step S4, the manufacturing device raises the lower member 207 such that the MEA 1 is pushed upward via the laminate 210A. As a result, tension is applied to the MEA 1 to remove creases and looseness from the MEA 1. As shown in FIG. 25, when the step S4 is executed for the second time onward, the MEA 1 is pushed upward by the laminate 210 rather than the laminate 210A.

Figure 26:
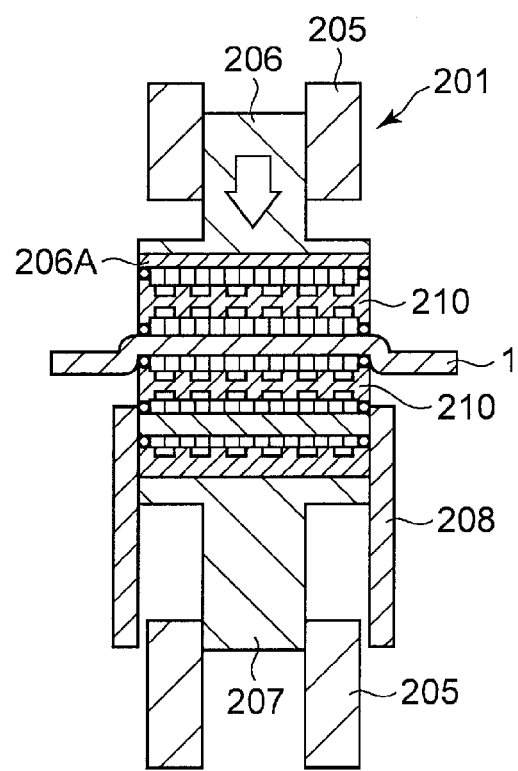
FIG. 26 is similar to FIG. 25, but shows a state in which the lamination unit presses a second separator against the MEA.

Next, in a step S5, the manufacturing device lowers the upper member 206 as shown in FIG. 26 to bring the laminate 210 into contact with the MEA 1. As a result, the MEA 1 is sandwiched between the laminate 210A and the laminate 210. When the processing of the step S5 is executed for the second time onward, the MEA 1 is sandwiched between two of the laminates 210.

Next, in a step S6, the manufacturing device lowers the upper member 206 and lower member 207 so that the MEA 1 is cut out from the perforation 213 and punched downward. When the perforation 213 is not formed on the MEA 1 and the cutter 215 is provided on the upper member 206, the MEA 1 is cut using the cutter 215. The upper member 206 and lower member 207 stop descending in a position at which a predetermined gap is secured between the upper end of the fuel cells 204 stacked in the holding frame 208, or in other words the upper end of the laminate 210 held on the suction pad 206A, and the MEA 1 on the periphery of the perforation 213.

In a following step S7, the manufacturing device releases the laminate 210 from the suction pad 208.

Figure 28:
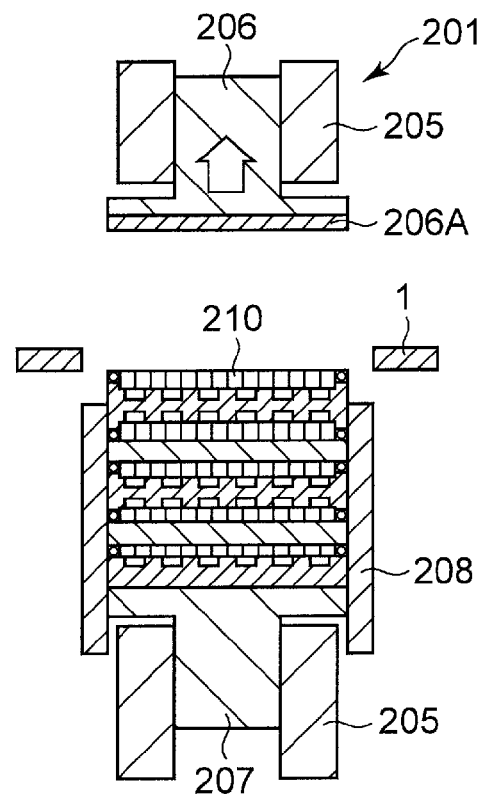
FIG. 28 is similar to FIG. 25, but shows a state in which the lamination unit has returned an upper member to an elevated position.

Next, in a step S8, the manufacturing device returns the upper member 206 to its elevated position, as shown in FIG. 28. The laminate 210 is held within the holding frame 208 laminated onto the punched-out MEA 1.

Next, in a step S9, the manufacturing device determines whether or not lamination of the planned predetermined number of fuel cells constituting the fuel cell stack is complete.

When fuel cell lamination is not complete, the manufacturing device repeats the processing of the steps S2 to S8. When fuel cell lamination is complete, the manufacturing device grips the laminate comprising the end plate using the suction pad 208 in a step S10, and lowers the upper member 206 such that the laminate is mounted on the top end of the fuel cells stacked in the holding frame 8 via the hole on the inside of the perforation 213 in the MEA 1. As noted above, the laminate used here corresponds to the laminate 210A shown in FIG. 23, reversed in the up-down direction.

By means of the processing described above, a fuel cell stack comprising a predetermined number of laminated fuel cells is manufactured. As described above, the fuel cell stack is finally fastened integrally by stud bolts and nuts, this operation being performed in a separate process.

According to this fuel cell stack manufacturing device, the MEA 1 is fed to the lamination unit 201 at predetermined intervals using the conveyance rollers 211, which comprise projections that engage with the holes 10 in the MEA 1, and hence the catalyst layer of the MEA 1 can be positioned directly beneath the upper member 206 of the lamination unit 210 with a high degree of accuracy. As a result, the MEA 1 can be laminated to the laminate 210 or the laminate 201A with accurate positioning.

Furthermore, in this manufacturing device operations to cut the MEA 1 and laminate the cut MEA 1 to the laminate 210 or 210A are performed in a single stroke of the upper member 206, and therefore the fuel cell stack can be manufactured efficiently.

In this embodiment, the upper member 206 laminates the MEA 1 to the laminate 210 from the upper side of the fuel cells stacked in the holding frame 208, but a constitution may be provided in which the holding frame 208 is fixed to the upper member 206 and the lower member 207 laminates the MEA 1 to the laminate 210 from the lower side of the fuel cells stacked in the upper holding frame 208.

It should be noted that the claimed first separator denotes the separator 220 supported by the lower member 207, while the claimed second separator denotes the separator 220 supported by the upper member 206.

The contents of Patent Application 2003-402491, filed in Japan on Dec. 2, 2003, and Patent Application 2003-422613, filed in Japan on Dec. 19, 2003, are incorporated herein by reference.

This invention was described above using several specific embodiments, but the invention is not limited to the above embodiments, which may be subjected to various corrections or modifications by a person skilled in the art within the technical scope of the claims.

Industrial Field of Application

As described above, in this invention, a polymer electrolyte membrane formed with conveyance holes is conveyed by rollers having projections formed on the outer periphery thereof for engaging with the holes, and hence in the fuel cell manufacturing process, the polymer electrolyte membrane can be positioned with a high degree of accuracy. Furthermore, the polymer electrolyte membrane can be supplied continuously, and hence an improvement in the manufacturing efficiency of the fuel cell can also be expected. This invention exhibits particularly favorable effects when applied to the manufacture of a polymer electrolyte fuel cell stack.

The invention claimed is:

1. A manufacturing method for a fuel cell formed by laminating a polymer electrolyte membrane and a separator alternately, comprising:
   (1) a process of supplying a film-form polymer electrolyte membrane from a side of a first separator, which is held in a predetermined position, to a position facing the first separator in parallel with the first separator, then;
   (2) a process of supplying a second separator and a cutter to an opposite side of the polymer electrolyte membrane, which faces the first separator, to the first separator; and, then,
   (3) a process of displacing the second separator and the cutter toward the first separator such that the polymer electrolyte membrane is sandwiched together with and between the first separator and the second separator and the polymer electrolyte membrane is cut into a predetermined shape and dimension at the same time that the first separator and second separate are cut into the same predetermined shape and dimension.

2. The manufacturing method as defined in claim 1, further comprising a process of applying tension to the polymer electrolyte membrane by pressing the first separator against the polymer electrolyte membrane prior to the displacement of the second separator.

3. The manufacturing method as defined in claim 1, wherein the polymer electrolyte membrane comprises conveyance holes formed in series at fixed intervals on both side portions thereof in a lengthwise direction, and the film-form polymer electrolyte membrane supplying process comprises a process of feeding the polymer electrolyte membrane to the position facing the first separator using a conveyance roller comprising on an outer periphery thereof projections which engage with the conveyance holes.

4. The manufacturing method as defined in claim 1, wherein a perforation having incisions which define a cutout part is formed in advance on the polymer electrolyte membrane at predetermined intervals, and the second separator displacing process comprises a process of cutting out the cutout part by pressing the perforation with the second separator.

5. The manufacturing method as defined in claim 1, further comprising a process of stacking a fuel cell comprising the first separator, the polymer electrolyte membrane, and the second separator, within a holding frame.

6. The manufacturing method as defined in claim 5, wherein the holding frame is constituted by a guide member which permits displacement of the fuel cell only in an identical direction to the displacement of the second separator.

7. A manufacturing device for a fuel cell formed by laminating a polymer electrolyte membrane and a separator alternately, comprising:
   (1) a mechanism for supplying a film-form polymer electrolyte membrane from a side of a first separator, which is held in a predetermined position, to a position facing the first separator in parallel with the first separator, which is operationally sequenced with;
   (2) a mechanism for supplying a second separator and a cutter to an opposite side of the polymer electrolyte membrane, which faces the first separator, to the first separator; and, which is operationally sequenced with,
   (3) a mechanism for displacing the second separator and the cutter toward the first separator such that the polymer electrolyte membrane is sandwiched together with and between the first separator and the second separator and the polymer electrolyte membrane is cut into a predetermined shape and dimension at the same time that the first separator and second separate are cut into the same predetermined shape and dimension.

8. The manufacturing device as defined in claim 7, further comprising a mechanism for applying tension to the polymer electrolyte membrane by pressing the first separator against the polymer electrolyte membrane prior to the displacement of the second separator.

9. The manufacturing device as defined in claim 7, wherein the polymer electrolyte membrane comprises conveyance holes formed in series at fixed intervals on both side portions thereof in a lengthwise direction, and the film-form polymer electrolyte membrane supplying mechanism comprises a mechanism for feeding the polymer electrolyte membrane to the position facing the first separator using a conveyance roller comprising on an outer periphery thereof projections which engage with the conveyance holes.

10. The manufacturing device as defined in claim 7, wherein a perforation having incisions which define a cutout part is formed in advance on the polymer electrolyte membrane at predetermined intervals, and the second separator displacing mechanism comprises a mechanism for cutting out the cutout part by pressing the perforation with the second separator.

11. The manufacturing device as defined in claim 7, further comprising a mechanism for stacking a fuel cell comprising the first separator, the polymer electrolyte membrane, and the second separator, within a holding frame.

12. The manufacturing device as defined in claim 11, wherein the holding frame is constituted by a guide member which permits displacement of the fuel cell only in an identical direction to the displacement of the second separator.

13. The manufacturing method as defined in claim 5, wherein the process of stacking a fuel cell comprises supporting previously laminated fuel cells within the holding frame from below using an elevatable lower member which ascends and descends between an elevated position and a lowered position depending on a thickness of the previously laminated fuel cells.

14. The manufacturing device as defined in claim 11, wherein the mechanism for stacking a fuel cell comprises an elevatable lower member which supports previously laminated fuel cells within the holding frame from below and ascends and descends between an elevated position and a lowered position depending on a thickness of the previously laminated fuel cells.

* * * * *